US008588371B2

(12) United States Patent
Ogawa et al.

(10) Patent No.: US 8,588,371 B2
(45) Date of Patent: Nov. 19, 2013

(54) PHASE SHIFT INVERTER, X-RAY HIGH-VOLTAGE DEVICE USING SAME, X-RAY CT DEVICE, AND X-RAY IMAGING DEVICE

(75) Inventors: Mina Ogawa, Tokyo (JP); Itaru Ando, Akita (JP); Kiyoshi Ohishi, Niigata (JP); Shoutaro Shindo, Niigata (JP)

(73) Assignees: Hitachi Medical Corporation, Tokyo (JP); Institute of National College of Technology, Tokyo (JP); National University Cooperation Nagaoka University of Technology, Niigata (JP)

( * ) Notice: Subject to any disclaimer, the term of this patent is extended or adjusted under 35 U.S.C. 154(b) by 283 days.

(21) Appl. No.: 13/127,289

(22) PCT Filed: Nov. 5, 2009

(86) PCT No.: PCT/JP2009/068871
§ 371 (c)(1),
(2), (4) Date: May 3, 2011

(87) PCT Pub. No.: WO2010/053108
PCT Pub. Date: May 14, 2010

(65) Prior Publication Data
US 2011/0222651 A1    Sep. 15, 2011

(30) Foreign Application Priority Data
Nov. 5, 2008    (JP) ................................. 2008-284438

(51) Int. Cl.
*H05G 1/10*    (2006.01)
(52) U.S. Cl.
USPC ....................................................... 378/101

(58) Field of Classification Search
USPC .......................................... 378/101, 110, 112
See application file for complete search history.

(56) References Cited

U.S. PATENT DOCUMENTS 4,719,558 A * 1/1988 Hanada et al. .................. 363/98
6,130,831 A * 10/2000 Matsunaga ..................... 363/98

FOREIGN PATENT DOCUMENTS

| JP | 63-92277 | 4/1988 |
| JP | 2000-58291 | 2/2000 |
| JP | 2000-134943 | 5/2000 |
| JP | 2005-94913 | 4/2005 |

\* cited by examiner

*Primary Examiner* — Jurie Yun
(74) *Attorney, Agent, or Firm* — Brundidge & Stanger, P.C.

(57) ABSTRACT

An inverter circuit allowing a single drive circuit to perform both tracking control for tracking resonance frequency fluctuations caused by load fluctuations, and power control, thereby reducing switching loss. An inverter drive circuit part obtains a phase difference between output current and output voltage directed to a load circuit connected to a midpoint of two arm circuits of the inverter circuit, and controls a phase of the driving signal directed to each semiconductor switch such that the phase difference becomes zero or a predetermined value, enabling an operating frequency of the inverter circuit part to track a resonance frequency of the load circuit, and enabling a current phase to be delayed with respect to a voltage phase, thereby achieving ZCS. Since the phase difference is used, an auxiliary circuit is not necessary for measuring a current value in proximity to the semiconductor switches.

18 Claims, 18 Drawing Sheets

PHASE SHIFT INVERTER, X-RAY HIGH-VOLTAGE DEVICE USING SAME, X-RAY CT DEVICE, AND X-RAY IMAGING DEVICE

TECHNICAL FIELD

The present invention relates to a phase shift inverter circuit driven at a frequency which tracks a resonance frequency caused by changes in load, and an X-ray high voltage generator using the phase shift inverter circuit.

BACKGROUND ART

A technique of the inverter circuit which is driven at a high frequency is applied to various equipment such as an induction heating cooking device which inductively heats a metallic pan using a high-frequency magnetic field, an industrial induction heating apparatus aiming at dissolution or quenching of metal, and an X-ray imaging apparatus and an X-ray CT (Computer Tomography) apparatus for a medical/industrial use to acquire an X-ray perspective image and a tomographic image of a test subject.

Typically, an inductor or an X-ray tube is considered as a load of the inverter circuit in those fields as described above, and its impedance may be largely different or change according to setup conditions of voltage and current, and temperature. Therefore, fluctuations occur in the resonance frequency of the load circuit. For example, as for the X-ray tube load, equivalent resistance may fluctuate drastically in the range of several tens of kΩ to several tens of MΩ according to a setup condition of X-ray output. The inverter circuit needs to control an operating frequency by tracking the load fluctuation, and simultaneously, needs to control the output according to the setup conditions of voltage and current.

Conventionally, PLL control has been employed against the load fluctuation, and as for the output control, voltage of a converter provided in the former stage of the inverter circuit is controlled, thereby simultaneously achieving both functions above. However, in this conventional apparatus, the control system is complicated and large in size, and thus the patent document 1 discloses a technique for implementing both functions by a single inverter circuit. In order to make the inverter operating frequency coincide with the change of resonance frequency caused by the load fluctuation, the technique disclosed by the patent document 1 detects current passing through two semiconductor switches or diodes inversely connected in parallel to the semiconductor switches, which are incorporated in the inverter circuit, and changes the inverter frequency in such a manner that current flowing periods become equal. In addition, in order to control the output power to be a desired value, a phase shift angle is controlled at which each of the semiconductor switches of the inverter circuit operates. With the configuration as described above, a single inverter achieves both the control for tracking the resonance frequency change due to the load fluctuation, and the control of power.

PRIOR ART DOCUMENT

Patent Document

[Patent Document 1]
Japanese unexamined patent application publication No. 2005-94913

SUMMARY OF THE INVENTION

Problem to be Solved by the Invention

The patent document 1 discloses that current sensors such as CT (Current Transformer) are placed surrounding the two semiconductor switches or the diodes inversely connected in parallel to the semiconductor switches incorporated in the inverter circuit, in order to detect current passing therethrough. Eventually, there is a need for a contrivance to elongate wiring for a length equivalent to the CT inserted length, for the wiring portion where the CT is inserted. However, in order to prevent breakage of the semiconductor switches and unstable operation which are caused by surge voltage, a packaging design such as using a copper bar, a copper bus bar, a processed copper plate, or the like, is essential for the inverter circuit, aiming at minimizing wiring inductance to the utmost extent. Therefore, a shorter distance between terminals is preferable, and thus it is requested that addition of the current sensor is avoided as far as possible.

Furthermore, the prime purpose of the disclosure described in the patent document 1 is to achieve coincidence between the resonance frequency of the load circuit and the inverter operation frequency, and switching loss is not considered in here.

FIG. 1(a) illustrates a voltage waveform and a current waveform of the semiconductor switch. The semiconductor switch changes from the ON state to the OFF state during the Turn-off period $T_{off}$, and generates turn-off loss $E_{sw(off)}$ of Isw×Vsw. Conversely, the semiconductor switch changes from the OFF state to the ON state during the Turn-on period $T_{on}$, and generates turn-on loss $E_{sw(on)}$ of Isw×Vsw. The loss is referred to as switching loss, and it increases proportionately with the operating frequency becoming higher. It is desirable to employ a soft switching method to reduce this switching loss.

Various circuits and control methods have been studied and put into practical use as the soft switching method, and key techniques among them are ZVS (Zero Voltage Switching) and ZCS (Zero Current Switching).

FIG. 1(b) illustrates the voltage waveform and the current waveform of the semiconductor switch in the case where ZVS and ZCS are applied in the soft switching. ZVS is a technique to reduce a loss of voltage×current, by restricting time variation dv/dt of the voltage during turn-on time and turn-off time of the switch. Typically, this technique is achieved by connecting a lossless snubber capacitor in parallel to the semiconductor switch and reducing dv/dt.

ZCS is a technique to bring the loss to zero, by turning the semiconductor switch on and off when the switch current is zero. In the case of the inverter circuit, when the semiconductor switch is turned to ON during the period when current passing through a diode inversely connected in parallel with the semiconductor switch, the current passing through the semiconductor switch is zero, and therefore, the loss of voltage×current becomes zero. Furthermore, since the voltage on both ends of the switch is also zero, it can be said that ZVS is concurrently achieved.

As one method of ZCS, there is a quasi resonant technique which employs an auxiliary circuit including an inductor and an additional semiconductor switch, so as to control the switch current to become negative when the semiconductor switch of the inverter circuit is OFF. In addition, there is another technique for achieving ZCS, by setting the inverter operating frequency slightly higher than the resonance frequency to delay a current phase with respect to a voltage phase and establishing a state that the current has negative polarity (i.e., the current flows into the diode, not into the switch).

The quasi resonant technique described as the former case has been already put into practice in an X-ray CT apparatus or the like. The technique described as the latter case where the inverter operating frequency is set slightly higher than the resonance frequency, only requires the frequency control if the resonance frequency is constant. Therefore, the latter case has an advantage that the auxiliary circuit is not needed and thus a main circuit configuration can be simplified.

Further explanations will be made as to the ZCS technique which controls the inverter operating frequency to be slightly higher than the resonance frequency. When the resonance frequency of the load circuit is constant, changes in the operating frequency of the inverter may cause a change from capacitive load to inductive load on the load side, accordingly. In other words, if the operating frequency is lower than the resonance frequency, the capacitive load is shown in which the current phase leads with respect to the voltage phase. Conversely, if the operating frequency is higher than the resonance frequency, the inductive load is shown in which the current phase is delayed with respect to the voltage phase. In the case of the inductive load, when focusing attention on one semiconductor switch, as shown in FIG. 1(b), the current has negative polarity (i.e., the current flows into the diode, not into the switch) at the point when the semiconductor switch is turned on, and accordingly it is possible to achieve ZCS.

However, when the load fluctuates and the resonance frequency varies accordingly, it is necessary to track this variation, together with controlling the inverter operating frequency to be slightly higher. However, it is not possible for the inverter circuit disclosed by the patent document 1 to achieve this control.

An object of the present invention is to provide an inverter circuit incorporating a single drive circuit which carries out tracking control and power control in response to resonance frequency variation caused by the load fluctuation, further the inverter circuit achieving reduction of switching loss.

Means to Solve the Problem

In order to achieve the object above, according to a first aspect of the present invention, a phase shift inverter circuit as described in the following is provided. In other words, the inverter circuit includes an inverter circuit part where two arm circuits are connected in parallel, each arm circuit having two semiconductor switches being serially connected, respective switches connected inversely in parallel with diodes, and an inverter drive circuit part for providing a driving signal to each of the semiconductor switches of the inverter circuit, wherein, the inverter drive circuit part obtains a phase difference between output current and output voltage directed to a load circuit which is connected to a midpoint of the two arm circuits, and controls a phase of the driving signal directed to each of the semiconductor switches in such a manner that the phase difference between output current and output voltage becomes zero or a predetermined value. As thus described, using the phase difference between the output current and the output voltage allows the operating frequency of the inverter circuit part to track the resonance frequency of the load circuit, and thus it is not necessary to insert a detector in proximity to the semiconductor switches to measure a current value, thereby achieving a simple configuration.

In addition, the inverter drive circuit part is capable of controlling the phase of the driving signal of each of the semiconductor switches in such a manner that the output current has a phase delayed from the output voltage by a predetermined value. Accordingly, it is possible to achieve ZCS and reduce switching loss.

According to a second aspect of the present invention, a phase shift inverter circuit as described in the following is provided. The phase shift inverter circuit includes an inverter circuit part where two arm circuits are connected in parallel, each arm circuit having two semiconductor switches being serially connected, respective switches inversely connected in parallel with diodes, and an inverter drive circuit part for providing a driving signal to each of the semiconductor switches of the inverter circuit, wherein, the inverter drive circuit part obtains an operating frequency of output power directed to a load circuit which is connected to a midpoint of the two arm circuits, and controls a phase of the driving signal directed to each of the semiconductor switches in such a manner that the operating frequency becomes higher than a resonance frequency of the load circuit, by a predetermined value. As thus described, the operating frequency is controlled so as to be higher than the resonance frequency by a predetermined value, allowing an inductive load to be shown in which a current phase is delayed with respect to a voltage phase, thereby achieving ZCS and reducing switching loss.

The inverter drive circuit part adjusts a phase difference of the driving signals directed to the semiconductor switches which are determined in advance to be used in a pair, among four semiconductor switches in the inverter circuit part, thereby enabling a control of the output power of the inverter circuit part.

The inverter drive circuit part is provided with a circuit for generating a fundamental wave signal with a certain duty cycle having a pulse width with a center equivalent to the center of a positive-polarity pulse width of the output voltage, and the driving signal is allowed to be generated by use of the fundamental wave signal.

In addition, the inverter drive circuit part is provided with a circuit for generating a fundamental wave signal with a certain duty cycle, the signal being inversed at a timing when the output voltage is changed from zero voltage to a positive polarity pulse or a negative polarity pulse, and the driving signal is allowed to be generated by use of the fundamental wave signal.

The inverter drive circuit part obtains the phase difference between the output current and the output voltage, by use of a phase of the current detected between the midpoint of the two arm circuits and the load circuit as the output current, and by use of a phase of the driving signal as the phase of the output voltage.

The third aspect of the present invention provides an X-ray high voltage generator. The X-ray high voltage generator includes a phase shift inverter circuit for converting a DC power source output into a high-frequency AC output, a high voltage transformer for converting the high-frequency AC output of the inverter circuit into a high voltage output, a rectifier circuit for rectifying the output of the high voltage transformer and supplying DC power to an X-ray tube, and a control circuit, wherein, the control circuit includes a filament heating circuit for heating a filament of the X-ray tube, and an anode rotary drive circuit for rotary driving of an anode of the X-ray tube. As the inverter circuit, the phase shift inverter circuit according to the first or the second aspect described above is employed.

The fourth aspect of the present invention provides an X-ray CT apparatus as described in the following. The X-ray CT apparatus includes a disc provided with an aperture for inserting a test subject, an X-ray tube and an X-ray detector respectively mounted on positions opposed to each other placing the aperture of the disc therebetween, an X-ray high voltage generator for supplying DC power to the X-ray tube, a bed for placing the test subject thereon to be inserted into the aperture of the disc, and a rotary drive part for rotating the disc. As the X-ray high voltage generator here, the X-ray high voltage generator according to the third aspect as described above is employed.

The fifth aspect of the present invention provides an X-ray imaging apparatus. The X-ray imaging apparatus includes an X-ray tube, an X-ray image receiver for detecting X-rays transmitted through a test subject, and an X-ray high voltage generator for supplying DC power to the X-ray tube. As the X-ray high voltage generator here, the X-ray high voltage generator according to the third aspect as described above is employed.

Effect of the Invention

According to the present invention, it is not necessary to conduct current measurement in proximity to the semiconductor switches, allowing a single unit to simultaneously control both the power and frequency, thereby achieving downsizing, weight saving, price reduction, and high reliability. Furthermore, the present invention allows ZCS to be achieved, thereby reducing the switching loss.

BRIEF DESCRIPTION OF DRAWINGS

FIG. 1(*b*) is a graph showing the voltage waveform and the current waveform for the case of soft switching;

BEST MODE FOR CARRYING OUT THE INVENTION

<First Embodiment>

Figure 2:
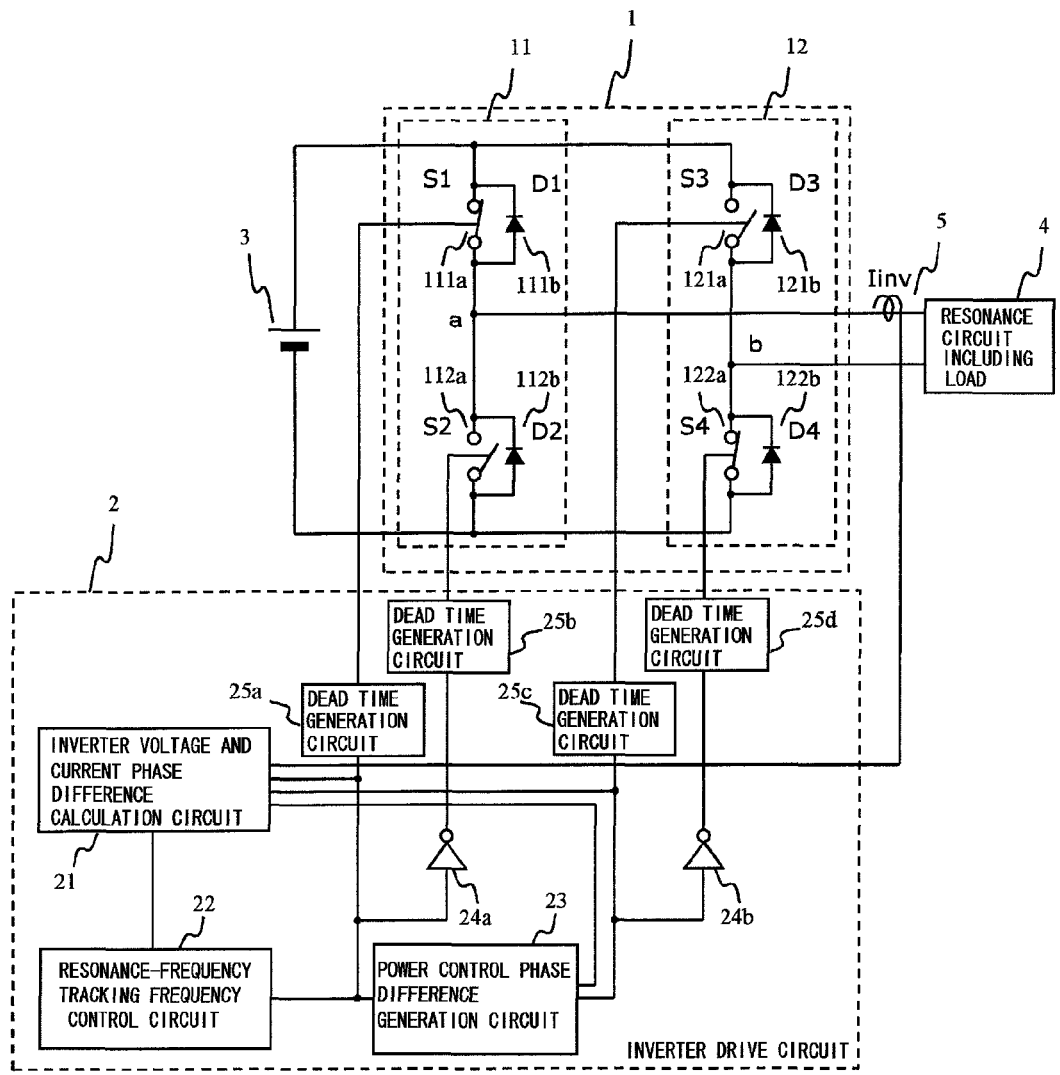
FIG. 2 is a block diagram showing a configuration of the phase shift inverter circuit according to the first embodiment.
Figure 3:
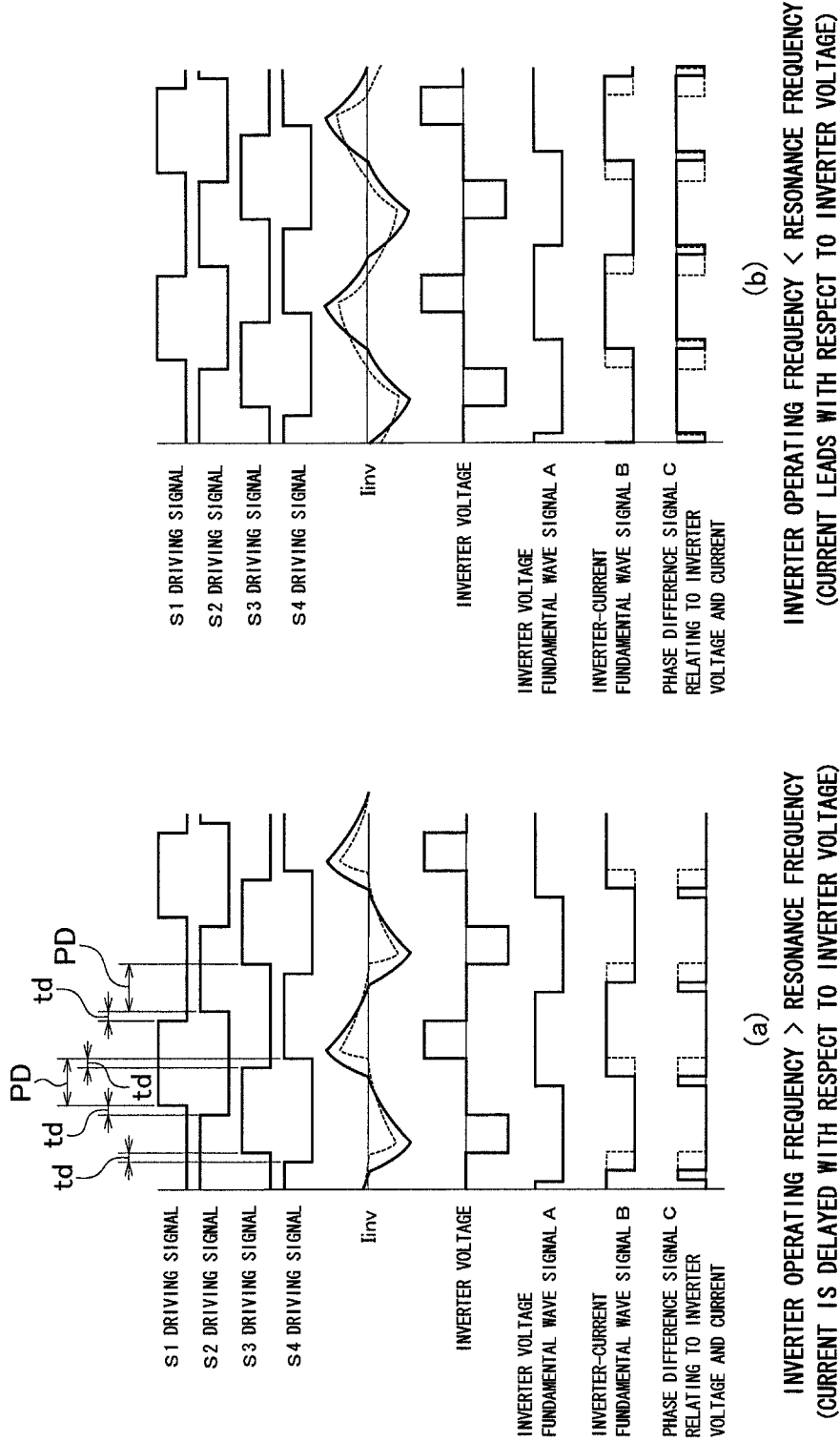
FIG. 3(*a*) illustrates operating waveforms of each part in the case where the inverter current is delayed from the inverter voltage (inverter operating frequency is higher than resonance frequency), and FIG. 3(*b*) illustrates operating waveforms of each part in the case where the inverter current leads the inverter voltage (inverter operating frequency is lower than resonance frequency), in the phase shift inverter circuit according to the first embodiment.

FIG. 2 is a schematic block diagram showing the phase shift inverter circuit according to the first embodiment, and FIG. 3(*a*) and FIG. 3(*b*) illustrate waveforms such as driving signals thereof.

The inverter circuit of the first embodiment includes an inverter circuit part 1 and an inverter drive circuit part 2. The inverter circuit part 1 is connected to a DC power source 3. The output terminals a and b in the inverter circuit part 1 are connected to the resonance circuit 3 including load.

The inverter circuit part 1 has a configuration where the arm circuits 11 and 12 are connected in parallel. The arm circuit 11 is a circuit where the semiconductor switches (S1, S2) 111*a* and 112*a* are serially connected, the respective switches being inversely connected in parallel with the diodes (D1, D2) 111*b* and 112*b*. The arm circuit 12 is a circuit where the semiconductor switches (S3, S4) 121*a* and 122*a* are serially connected, the respective switches being inversely connected in parallel with the diodes (D3, D4) 121*b* and 122*b*. The output terminal a is disposed at the midpoint of the arm circuit 11 (between the semiconductor switch (S1) 111*a* and the semiconductor switch (S2) 112*a*), and the output terminal b is disposed at the midpoint of the arm circuit 12 (between the semiconductor switch (S3) 121*a* and the semiconductor switch (S4) 122*a*). The inverter drive circuit part 2 providing driving signals (gate voltage signals) as shown in FIG. 3(*a*) is connected to each of the semiconductor switches (S1 to S4) 111*a*, 112*a*, 121*a*, and 122*a*.

The inverter drive circuit part 2 incorporates an inverter voltage and current phase difference calculation circuit 21, a resonance-frequency tracking frequency control circuit 22, a power control phase difference generation circuit 23, dead time generation circuits 25a to 25d, and inversion logic circuits 24a and 24b. The inverter voltage and current phase difference calculation circuit 21 brings in a detection result from the current sensor 5 which detects output current Iinv of the inverter circuit part 1, and calculates a phase difference between the output current Iinv and output voltage (inverter voltage) of the inverter circuit part 1. The resonance-frequency tracking frequency control circuit 22 determines an operating frequency of the inverter circuit part 1, according to the phase difference which is calculated in the inverter voltage and current phase difference calculation circuit 21. The power control phase difference generation circuit 23 aims at controlling electric power and controls output power by controlling the phase difference PD of the driving signals being supplied to the semiconductor switches 111a, 112a, 121a, and 122a. The dead time generation circuits 25a to 25d delay the rising edge of the driving signal by a predetermined time (dead time td), so as to prevent a situation that the two semiconductor switches within each of the arm circuits 11 and 12 are simultaneously turned on and cause short-circuit of DC voltage. The inversion logic circuit 24 effects the inverse operation of the vertically located semiconductor switches in each of the arm circuits 11 and 12 (switch (S1) 111a and switch (S2) 112a; and switch (S3) 121a and switch (S4) 122a), so as to implement the inverter circuit.

Among operation principles of the inverter circuit part 1, the principle of inverter operation of voltage signal and the output power control are the same as those of a publicly known inverter circuit, which are described in the patent document 1. Therefore, in here, only simplified explanations will be given. As shown in FIG. 3(a), signals are outputted to the resonance circuit 4 in the following cases; (1) driving signals are inputted simultaneously in the semiconductor switch (S1) 111a and in the semiconductor switch (S4) 122a, or (2) driving signals are inputted simultaneously in the semiconductor switch (S2) 112a and in the semiconductor switch (S3) 121a. No voltage signals are outputted in the case where driving signals are inputted only either one of the semiconductor switches, or in the case where driving signals are inputted through a way other than the combination of (1) and the combination (2) described above.

The power control phase difference generation circuit 23 sets as the phase difference PD, the phase difference between the driving signal directed to the semiconductor switch (S1) 111a and the driving signal directed to the semiconductor switch (S4) 122a, and the phase difference between the driving signal directed to the semiconductor switch (S2) 112a and the driving signal directed to the semiconductor switch (S3) 121a. With these settings, when the phase difference PD becomes larger, the time period when the driving signals are inputted simultaneously in the switch (S1) 111a and the switch (S4) 122a becomes shorter. Similarly, the time period when the driving signals are inputted simultaneously in the switch (S2) 112a and the switch (S3) 121a becomes shorter. Therefore, an effective value of the inverter voltage becomes smaller, and the output power decreases. The phase difference PD is controlled by using a PI compensator, for instance. If the phase difference PD is zero, it operates in an equivalent manner as a general inverter that operates with a PWM duty ratio of 50%, and with increase of the phase difference, an operation to limit more output is performed. Accordingly, it is possible to control the output power of the inverter circuit.

Next, an explanation will be made as to the control of the inverter operating frequency of the inverter circuit according to the present embodiment. The present embodiment features that the inverter operating frequency is controlled based on the phase difference between the output voltage and the output current of the inverter circuit. In other words, the output terminals a and b of the inverter circuit part 1 are connected with the resonance circuit including the load 4, assumed as a load circuit, and therefore, those are regarded as a resonance circuit as a whole. Therefore, when the operating frequency (frequency of the output signal) of the inverter circuit coincides with the resonance frequency of the resonance circuit including the load 4, power factor of the inverter circuit 1 is equal to 1, that is, the phase difference between the output voltage and the output current of the inverter circuit becomes zero. Therefore, a difference between the phase of the output voltage (inverter voltage) and the phase of the output current Iinv of the inverter circuit is detected, and the inverter circuit part 1 is controlled so as to bring coincidence therebetween, then allowing the operating frequency of the inverter circuit to coincide with the resonance frequency of the resonance circuit including the load 4, and further achieving the tracking of the resonance frequency, if there are any fluctuations.

Figure 1:
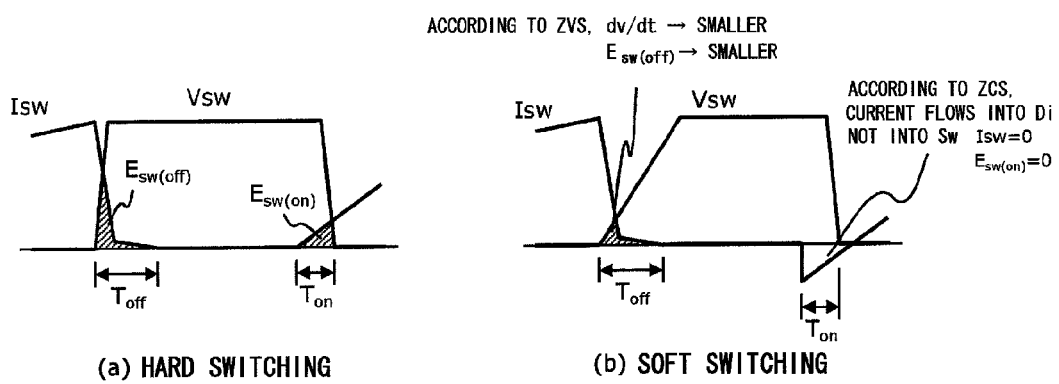
FIG. 1(*a*) is a graph showing the voltage waveform and the current waveform for the case of hard switching.

On the other hand, when control is exerted in such a manner that the phase of the output current Iinv is delayed with respect to the phase of the output voltage of the inverter circuit, focusing on one semiconductor switch, current has negative polarity at the time of turning on the semiconductor switch (i.e., the current flows into the diode, not into the switch) as shown in FIG. 1(b). Therefore, it is possible to achieve ZCS. In the case above, the operating frequency of the inverter circuit keeps the state slightly higher than the resonance frequency of the resonance circuit 4, and tracks the resonance frequency.

As thus described, according to the present invention, the phase difference between the output voltage and the output current Iinv of the inverter circuit is detected, and the phase difference is controlled in such a manner that it becomes zero or a predetermined value, thereby allowing the operating frequency of the inverter circuit to track the resonance frequency including the load 4, coinciding with the resonance frequency, or with a predetermined value of frequency drift.

In the first embodiment, an explanation will be made as to a control operation for tracking resonance frequency fluctuations, while keeping the inverter operating frequency to coincide with the resonance frequency.

Figure 4:
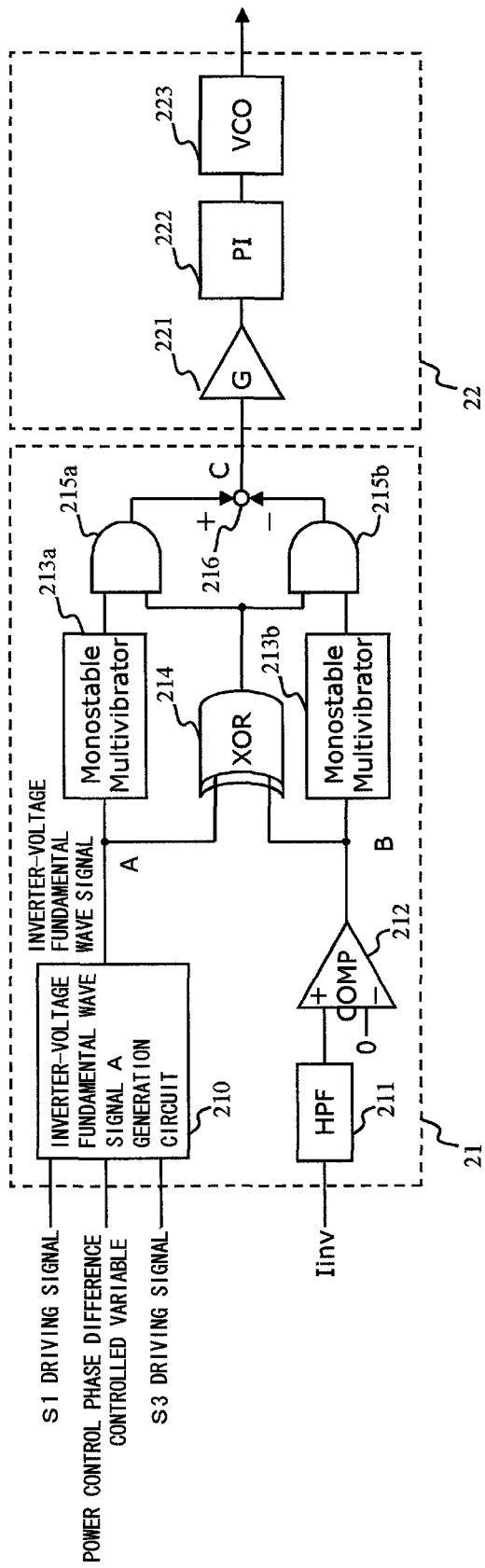
FIG. 4 is a block diagram showing a configuration of the inverter voltage and current phase difference calculation circuit 21 and the resonance-frequency tracking frequency control circuit 22 according to the first embodiment.

FIG. 4 illustrates internal configurations of the inverter voltage and current phase difference calculation circuit 21 and the resonance-frequency tracking frequency control circuit 22. FIG. 3(a) shows one example of waveforms, as to the input signals, the inverter voltage, and respective signals at A, B, and C points, which are illustrated in FIG. 4. The dotted lines in FIG. 3(a) indicate the case where the phase difference between the output voltage (inverter voltage) and the output current (inverter current) of the inverter circuit is widened.

As shown in FIG. 4, the inverter voltage and current phase difference calculation circuit 21 incorporates, an inverter-voltage fundamental wave signal A generation circuit 210, a high pass filter 211, a comparator 212, an exclusive OR operation unit 214 for obtaining exclusive OR between the output from the fundamental wave signal A generation circuit 210 and the output from the comparator 212, monostable multi-vibrators 213a and 213b, AND operation units 215a and 215b, and an adder 216.

The inverter-voltage fundamental wave signal A generation circuit 210 generates an inverter-voltage fundamental wave signal A, on the basis of driving signals respectively from the semiconductor switch (S1) 111*a* and the semiconductor switch (S3) 121*a*, and a power control phase difference controlled variable being outputted from the power control phase difference generation circuit 23. A configuration and an operation of the inverter-voltage fundamental wave signal A generation circuit 210 will be described later. On the other hand, as for the inverter current Iinv detected by the current sensor 5, a low frequency component is cut by means of the high-pass filter 211, and it is compared with zero by the comparator 212. Accordingly, an inverter-current fundamental wave signal B is obtained which is responsive to the positive or negative polarity of the current Iinv.

The inverter-voltage fundamental wave signal A and the inverter-current fundamental wave signal B are inputted respectively in the monostable multivibrators 213*a* and 213*b*, and arbitrary pulse-width signals are outputted at the rising time and the falling time of each of the signals. The pulse width is assumed to be smaller than a half of the inverter drive cycle. On the other hand, the exclusive-OR operation unit 214 carries out operations on the inverter-voltage fundamental wave signal A and the inverter-current fundamental wave signal B, and results of the operations and outputs from the monostable multivibrators 213*a* and 213*b* respectively, go through the AND operation units 215*a* and 215*b*, then obtaining a difference therebetween by the adder 216, thereby extracting a signal C indicating the phase difference between the inverter voltage and the inverter current Iinv. As for the signal C, the pulse width represents the size of the phase difference, and when the pulse is positive, it indicates a delay of current (a state where the phase of the inverter current Iinv delays from the phase of the inverter voltage), and the inverter operating frequency becomes higher than the resonance frequency. On the other hand, as shown in FIG. 3(*b*), when the pulse of the signal C is negative, it indicates a lead of current (a state where the phase of the inverter current Iinv leads the phase of the inverter voltage), and the inverter operating frequency becomes lower than the resonance frequency.

Here, as shown in FIG. 4, the resonance-frequency tracking frequency control circuit 22 incorporates an amplifier 221, PI compensator 222, and VCO (Voltage Controlled Oscillator) 223. The amplifier 221 amplifies the output from the inverter voltage and current phase difference calculation circuit 21, the PI compensator 222 subjects the amplified output to proportional control and integral processing so as to obtain an arbitrary response, and then the VCO 223 adjusts and outputs a frequency on the basis of the output signal from the PI compensator 222. The dead time generation circuit 25*a* subjects the output signal from the VCO 223 to a delay processing for delaying the rising edge only by a predetermined dead time td, and it is supplied to the switch (S1) 111*a* as a driving signal. The inverse logic circuit 24*a* subjects the output signal from the VCO 223 to inverse processing, the dead time generation circuit 25*b* subjects the output signal to the delay processing for delaying the rising edge only by a predetermined dead time td, and it is supplied to the switch (S2) 112*a* as a driving signal.

The power control phase difference generation circuit 23 aims at setting a predetermined value to the output power, and delays the phase of the output signal from the VCO 223, so that the phase difference of the driving signal of the switch (S4) with respect to the driving signal to the switch (S1) and the phase difference of the driving signal of the switch (S3) with respect to the driving signal to the switch (S2) respectively become predetermine phase differences PD. The output is delayed only by the dead time td in the dead time generation circuit 25*c*, and it is supplied to the switch (S3) 121*a* as a driving signal. Furthermore, the inverse logic circuit 24*b* subjects the output to the inverse processing, the dead time generation circuit 25*b* subjects the output to the delay processing for delaying the rising edge only by the dead time td, and then the processed result is supplied to the switch (S4) 122*a* as a driving signal.

Figure 5:
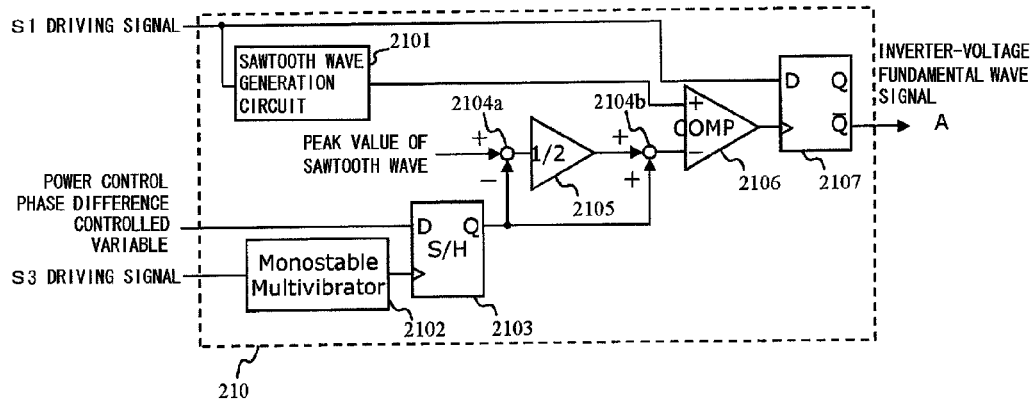
FIG. 5 is a block diagram showing a configuration of inverter-voltage fundamental wave signal A generation circuit 210 according to the first embodiment.
Figure 6:
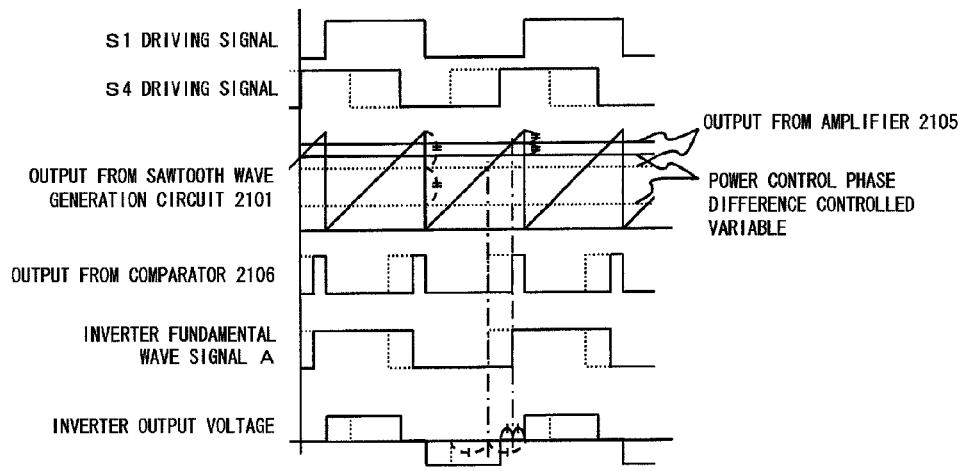
FIG. 6 illustrates the operating waveform of the inverter-voltage fundamental wave signal A generation circuit 210 and the inverter output voltage waveform according to the first embodiment.

FIG. 5 is an internal configuration of the inverter-voltage fundamental wave signal A generation circuit 210 which is shown in FIG. 4. FIG. 6 shows one example of waveforms at some points shown in FIG. 5. The waveforms indicated by dotted lines represent the case where the phase difference is further widened. The inverter-voltage fundamental wave signal A generation circuit 210 generates a waveform with a duty cycle of 50% having a pulse width with a center equivalent to the center of the positive-polarity pulse width of the inverter output voltage.

The inverter-voltage fundamental wave signal A generation circuit 210 has a configuration that carries out an operation, using the driving signal of the semiconductor switch (S1) 111*a*, a controlled variable signal outputted from the power control phase difference generation circuit 23 (referred to as "a power control phase difference controlled variable signal"), a driving signal of the semiconductor switch (S3) 121*a*, and a sawtooth wave generated internally. Specifically, the inverter-voltage fundamental wave signal A generation circuit 210 incorporates a sawtooth wave generation circuit 2101, a monostable multivibrator 2102, a sample hold circuit 2103, adders 2104*a* and 2104*b*, an amplifier 2105, a comparator 2106, and a D flip-flop circuit 2107.

The sawtooth wave generation circuit 2101 is reset at the rising time and the falling time of the driving signal of the semiconductor switch (S1) 111*a*, and generates a sawtooth wave of peak a [V] (for example, 5V). The power control phase difference controlled variable signal indicates an analog quantity representing the phase difference PD between the semiconductor switches S1 and S4, and when the phase difference PD is zero, the quantity is a[V], and when it is maximum n, the value is 0[V]. The adder 2104*a* calculates a difference between the peak value a[V] of the sawtooth wave and the controlled variable signal, the amplifier 2105 multiplies the result by ½, the adder 2104*b* adds the resulting signal to the power control phase difference controlled variable, and then, the result is assumed as a threshold. Subsequently, the comparator 2106 operates so as to generate the rising time and the falling time of the fundamental wave signal A, at the timing when the threshold crosses a rising gradient line of the sawtooth wave. The D flip-flop circuit 2107 generates a signal with a reverse polarity relative to the S1 driving signal, at the pulse timing of the comparator 2106.

With the configuration as described above, an inverter-voltage fundamental wave signal A is generated which repeats rising and falling at the midpoint timing of the period when the inverter voltage is 0 V. In other words, there is generated a waveform with a duty cycle of 50% having a pulse width with a center equivalent to the center of the positive-polarity pulse width of the inverter output voltage.

In FIG. 5, the power control phase difference controlled variable signal is inputted via the sample hold circuit 2103, not directly inputted into the adder 2104*a* or 2104*b*. This is because the power control phase difference controlled variable is a signal having fluctuations, and irrelevant values may be slightly inputted into the adders 2104*a* and 2104*b*. Therefore, it is necessary to prevent occurrence of offset in the operation result. As shown in FIG. 6, the sample hold circuit 2103 takes a sample at the crossing point between the power control phase difference controlled variable and the sawtooth wave, thereby finding out a midpoint between the crossing point and the sawtooth wave peak value. The monostable multivibrator 2102 generates timing signals of the rising edge and the falling edge of the driving signal of the semiconductor switch (S3) 121a. The sample hold circuit 2103 performs sample holding by using this timing signals. It is to be noted that the timing of the sample holding may not be limited to the timing of the driving signal of the switch S3. In addition, the cycle of the sawtooth wave generated by the sawtooth wave generation circuit 2101 is assumed as synchronizing with the rising and falling of the S1 driving signal. However, this is not the only example, but if the inverter-voltage fundamental wave signal A generation circuit 210 satisfies the following, it is assumed as a sufficient configuration; the configuration achieving a function to generate a waveform with a duty cycle of 50%, having a center equivalent to the center of the positive-polarity pulse width of the inverter output voltage.

Figure 7:
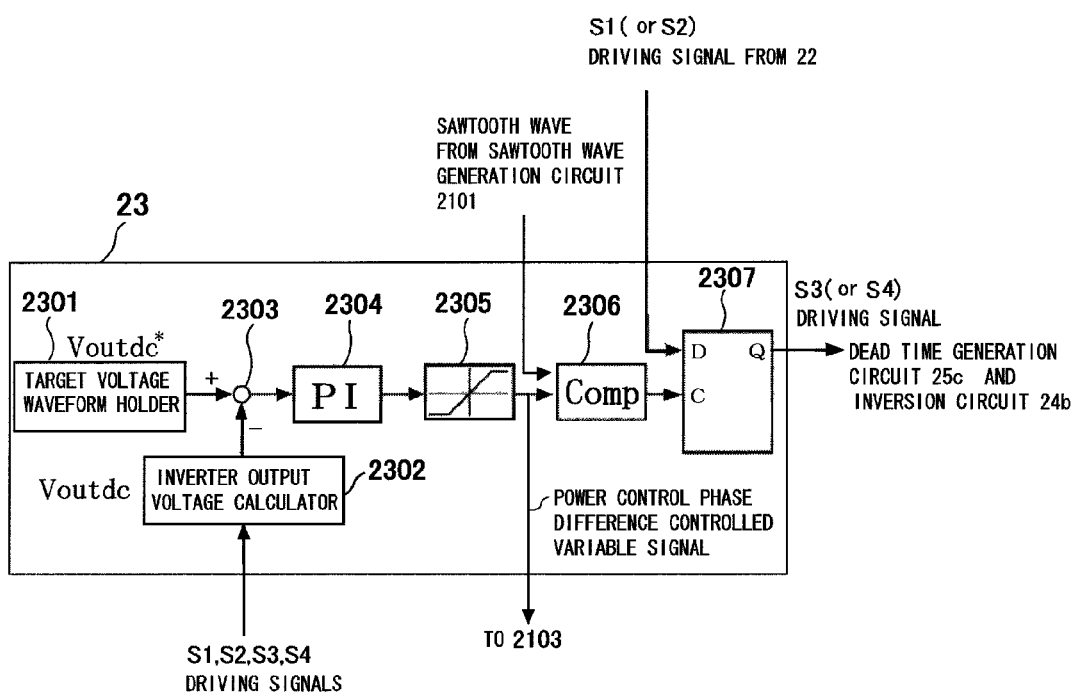
FIG. 7 is a block diagram showing a specific configuration of the power control phase difference generation circuit 23 according to the first embodiment.
Figure 8:
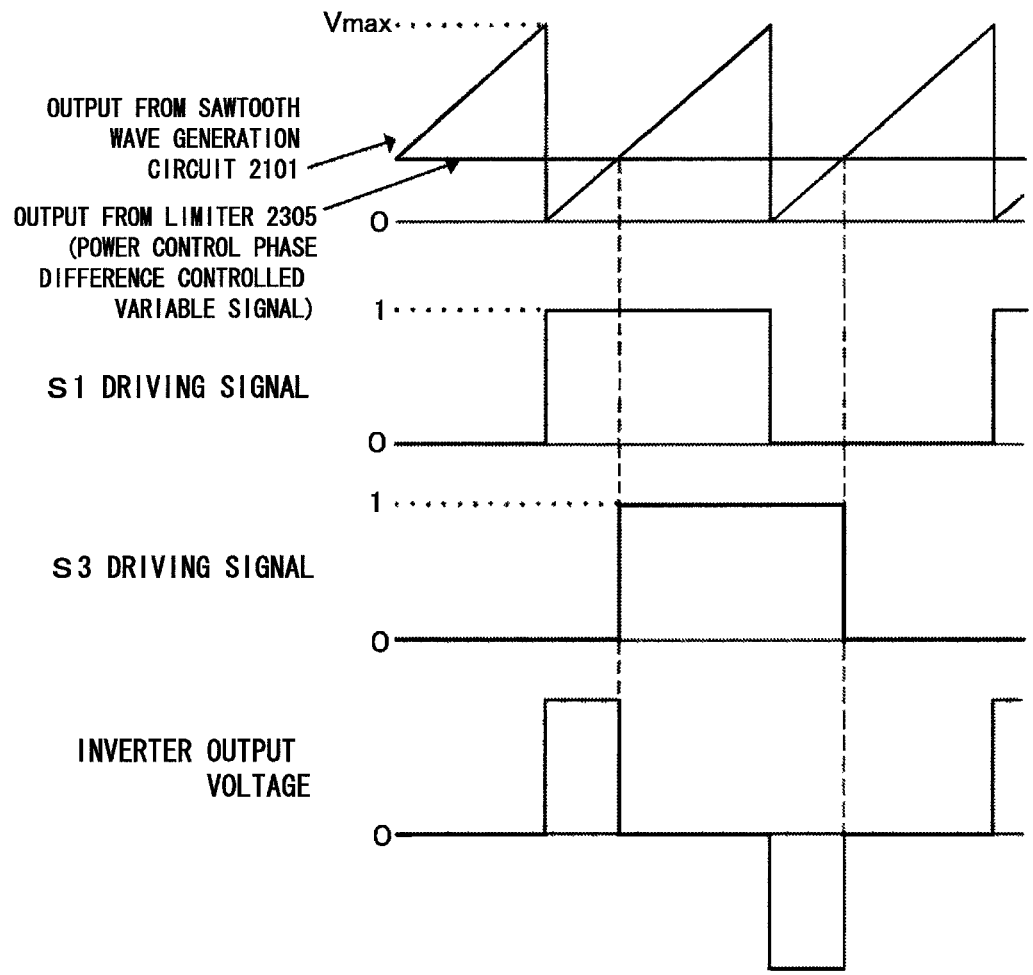
FIG. 8 illustrates signal waveforms within the power control phase difference generation circuit 23 shown in FIG. 7.

With reference to FIG. 7 and FIG. 8, a configuration and an operation of the power control phase difference generation circuit 23 will be explained specifically. FIG. 7 illustrates an internal circuit configuration of the power control phase difference generation circuit 23, and FIG. 8 illustrates signal waveforms at predetermined positions within the power control phase difference generation circuit 23. As shown in FIG. 7, the power control phase difference generation circuit 23 incorporates a target voltage waveform holder 2301, an inverter output voltage calculator 2302, an adder 2303, a PI compensator 2304, a limiter 2305, a comparator 2306, and a D flip-flop circuit 2307. The target voltage waveform holder 2301 holds an inverter output waveform which is defined in advance as a target. The inverter output voltage calculator 2302 brought in the driving signals supplied to the semiconductor switches (S1, S2, S3, S4) 111a, 112a, 121a, and 122a, and calculates an inverter output voltage waveform of the inverter circuit part 1 based on those driving signals. A method for calculating the inverter output voltage waveform based on the driving signals of the semiconductor switches (S1, S2, S3, S4) 111a, 112a, 121a, and 122a is publicly known and therefore, it will be explained just briefly. For example, if DC voltage supplied from the DC power source 2 to the inverter circuit part 1 is assumed as ±Vdc, the inverter output voltage becomes +2Vdc when the semiconductor switches S1 and S4 are simultaneously turned on, and it becomes zero when either one of them is turned off. On the other hand, when the switch S2 and the switch S3 are simultaneously turned on, the inverter output voltage becomes −2Vdc, and it becomes zero when either one of them is turned off. Accordingly, the inverter output voltage calculator 2302 calculates the inverter output voltage waveform.

The adder 2303 obtains a difference between the output waveform from the target voltage waveform holder 2301 and the inverter output voltage waveform calculated by the inverter output voltage calculator 2302, the PI compensator 2304 subjects a signal of the difference to proportional control and integral processing, and the limiter 2305 imposes limits, setting a maximum value as a [V]. The signal obtained according to the processing as described above is a power control phase difference controlled variable. The power control phase difference controlled variable signal is an analog quantity representing the phase difference PD between the semiconductor switch S1 and S4, and it takes a value of a[V] when the phase difference PD is zero, and it takes a value of 0[V] when the phase difference PD is maximum value π. The comparator 2306 compares the power control phase difference controlled variable signal outputted from the limiter 2305, with the sawtooth wave brought in from the sawtooth wave generation circuit 2101, and outputs a waveform in which output values are switched at the timing when the magnitude relation of both signals are switched. FIG. 8 shows one example of the power control phase difference controlled variable signal and the sawtooth wave.

An output from the comparator 2306 is inputted into the C terminal of the D flip-flop circuit 2307. The driving signal of the switch S1 (or S2), which is outputted from the resonance-frequency tracking frequency control circuit 22, is inputted into the D terminal. Accordingly, at the rising time of the output signal (C terminal) from the comparator 2306, a waveform holding a value of the driving signal of the switch S1 (or S2) is outputted from Q terminal. An output waveform from the Q terminal of the D flip-flop circuit 2307 is a driving signal of the switch S3 (or S4). The dead time generation circuit 25c delays a driving signal of the switch S3 by a predetermined quantity, and the signal is supplied to the switch (S3) 121a. The driving signal of the switch S3 is inverted by the inversion logic circuit 24b, and it becomes a driving signal of the switch S4. Then, the dead time generation circuit 25d delays this signal by a predetermined quantity, and supplied to the switch (S4) 122a.

According to such processing within the power control phase difference generation circuit 23 as described above, it is possible to control the phase difference PD between the switches S1 and S4, thereby controlling the output power of the inverter circuit part 1. It is to be noted that the power control phase difference controlled variable signal outputted from the limiter 2305 is transferred to the inverter voltage and current phase difference calculation circuit 21, and it is inputted into the sample hold circuit 2103.

With the configuration as described above, it is possible to detect a phase difference between the output voltage and the output current Iinv of the inverter circuit, and control the phase difference to become zero. Therefore, the operating frequency of the inverter circuit is made to coincide with, or drifted by a predetermined value from, the resonance frequency of the resonance circuit including the load 4. Accordingly, it is not necessary to insert the current sensors into the arm circuit of the inverter, unlike the disclosure of the patent document 1. Therefore, surge voltage is prevented, and a reliable and downsized phase shift inverter circuit can be provided.

<Second Embodiment>

In the first embodiment, there has been explained a circuit configuration which allows the inverter operating frequency to coincide with the resonance frequency. In the second embodiment, a circuit configuration will be explained, which controls the phase of the output current Iinv to delay with respect to the phase of the output voltage of the inverter circuit, and as shown in FIG. 1(b), the current is given negative polarity (i.e., the current flows into the diode, not into the switch) at the time point when the semiconductor switch is turned on, thereby achieving ZCS. In this case, the operating frequency of the inverter circuit tracks the resonance frequency, while being kept slightly higher than the resonance frequency of the resonance circuit 4.

Figure 9:
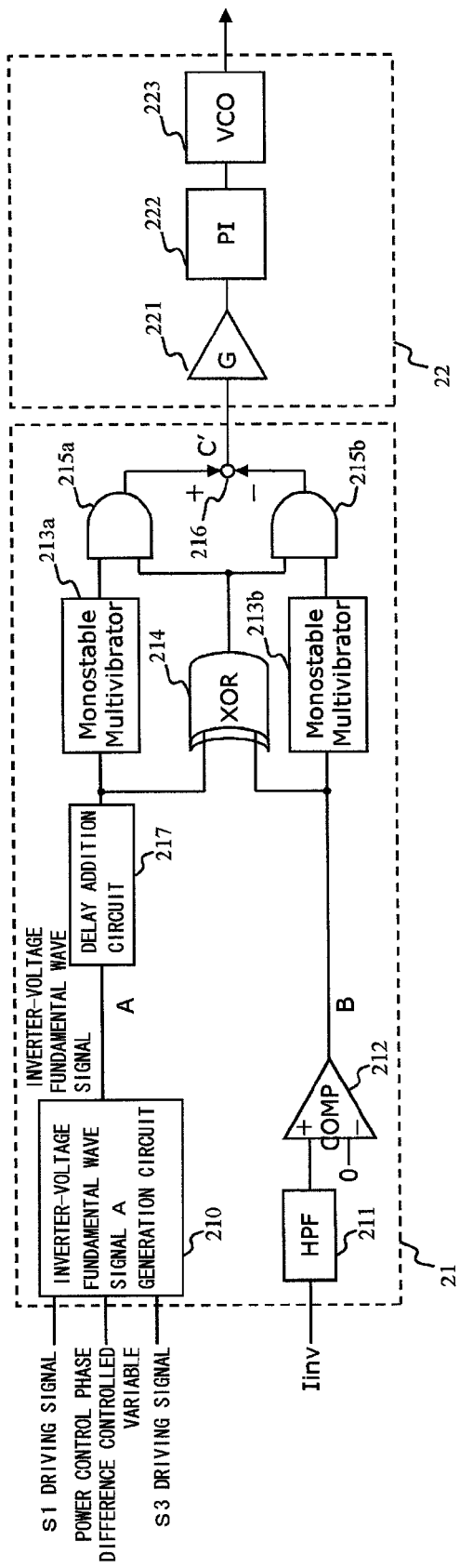
FIG. 9 is a block diagram showing a configuration of the inverter voltage and current phase difference calculation circuit 21 and the resonance-frequency tracking frequency control circuit 22 according to the second embodiment.

FIG. 9 shows the inverter voltage and current phase difference calculation circuit 21 and the resonance-frequency tracking frequency control circuit 22 according to the second embodiment. Basic structure of the second embodiment is similar to that of the first embodiment, but the internal configuration of the inverter voltage and current phase difference calculation circuit 21 is different. In the first embodiment as shown in FIG. 4, an output from the inverter-voltage fundamental wave signal A generation circuit 210 is directly inputted in the monostable multivibrator 213a and the exclusive OR operation unit 214. In the second embodiment, as shown in FIG. 9, a delay addition circuit 217 is inserted in the later stage of the fundamental wave signal A generation circuit 210. Accordingly, the inverter-voltage fundamental wave signal A is delayed constantly by the quantity that is set in the delay addition circuit 217. The delay set in the delay addition circuit 217 is assumed as a time shorter than the minimum pulse width of the inverter voltage when the inverter is operated at the maximum frequency, for instance. It is to be noted that a configuration similar to the first embodiment will not be explained tediously.

With the configuration as described above, the inverter current Iinv is controlled in the phase which is delayed with respect to the inverter voltage. Therefore, at the time when the semiconductor switch is turned on, the current is allowed to have negative polarity (i.e., the current flows into the diode, not into the switch), thereby achieving ZCS. It is to be noted that the operating frequency of the inverter circuit tracks the resonance frequency of the resonance circuit including the load 4, being higher than the resonance frequency by a predetermined quantity, and therefore, ZCS can be achieved while tracking fluctuations of the resonance frequency.

<Third Embodiment>

Figure 10:
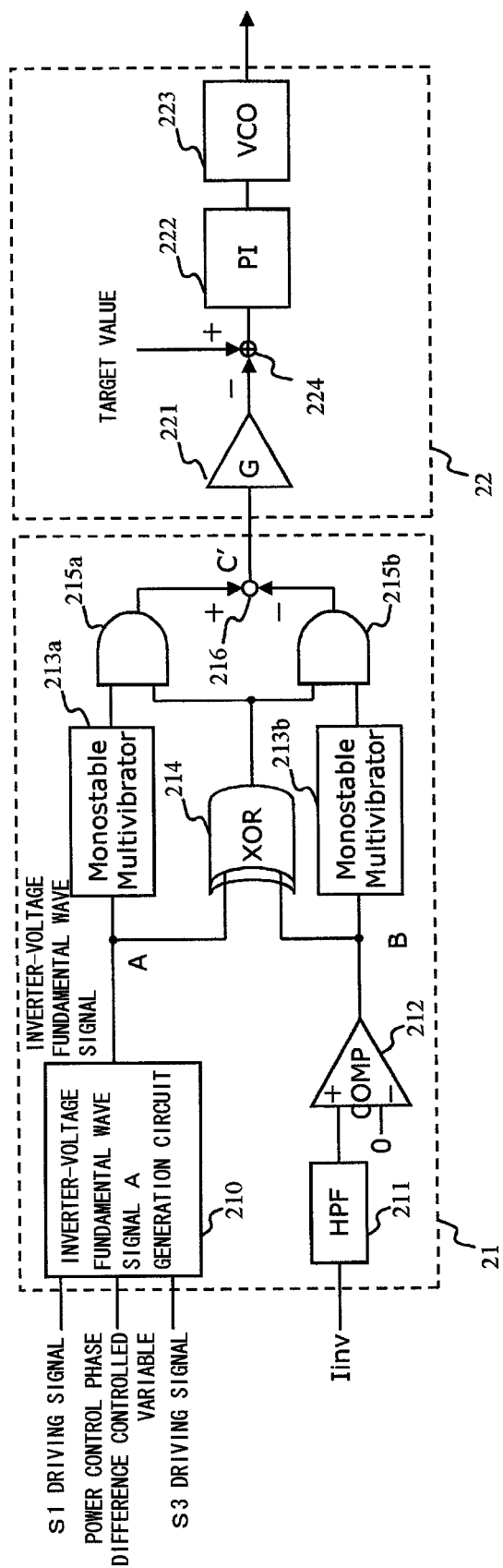
FIG. 10 is a block diagram showing a configuration of the inverter voltage and current phase difference calculation circuit 21 and the resonance-frequency tracking frequency control circuit 22 according to the third embodiment.

The inverter circuit according to the third embodiment controls the phase of the output current Iinv to be delayed with respect to the phase of the output voltage of the inverter circuit, thereby achieving ZCS, similar to the second embodiment. Unlike the second embodiment, however, the delay addition circuit 217 is not placed in the inverter voltage and current phase difference calculation circuit 21, but as shown in FIG. 10, a difference operation unit 224 is placed inside the resonance-frequency tracking frequency control circuit 22. Since the remaining part of the configuration is the same as that of the first embodiment, tedious explanations will not be made.

FIG. 10 illustrates the inverter voltage and current phase difference calculation circuit 21 and the resonance-frequency tracking frequency control circuit 22 according to the third embodiment. It is different from the first and the second embodiments, in the point that the difference operation unit 224 is added on the later stage of the amplifier 221. The difference operation unit 224 carries out an operation to calculate a difference between the output from the amplifier 221 and a target value, and the difference value is inputted in the PI compensator 222.

With the configuration above, the phase difference between the inverter voltage and the inverter current is constantly controlled so that the phase difference reaches a certain target value. Therefore, the phase of the inverter current Iinv is delayed by a predetermined value with respect to the inverter voltage, thereby achieving ZCS. Furthermore, the operating frequency of the inverter circuit tracks the resonance frequency of the resonance circuit including the load 4, at a frequency higher than the resonance frequency by a predetermined quantity, and thus it is possible to track the fluctuations of the resonance frequency.

The difference operation unit 224 has the same effect also in the case where it is provided in the former stage of the amplifier 221.

<Fourth Embodiment>

Figure 11:
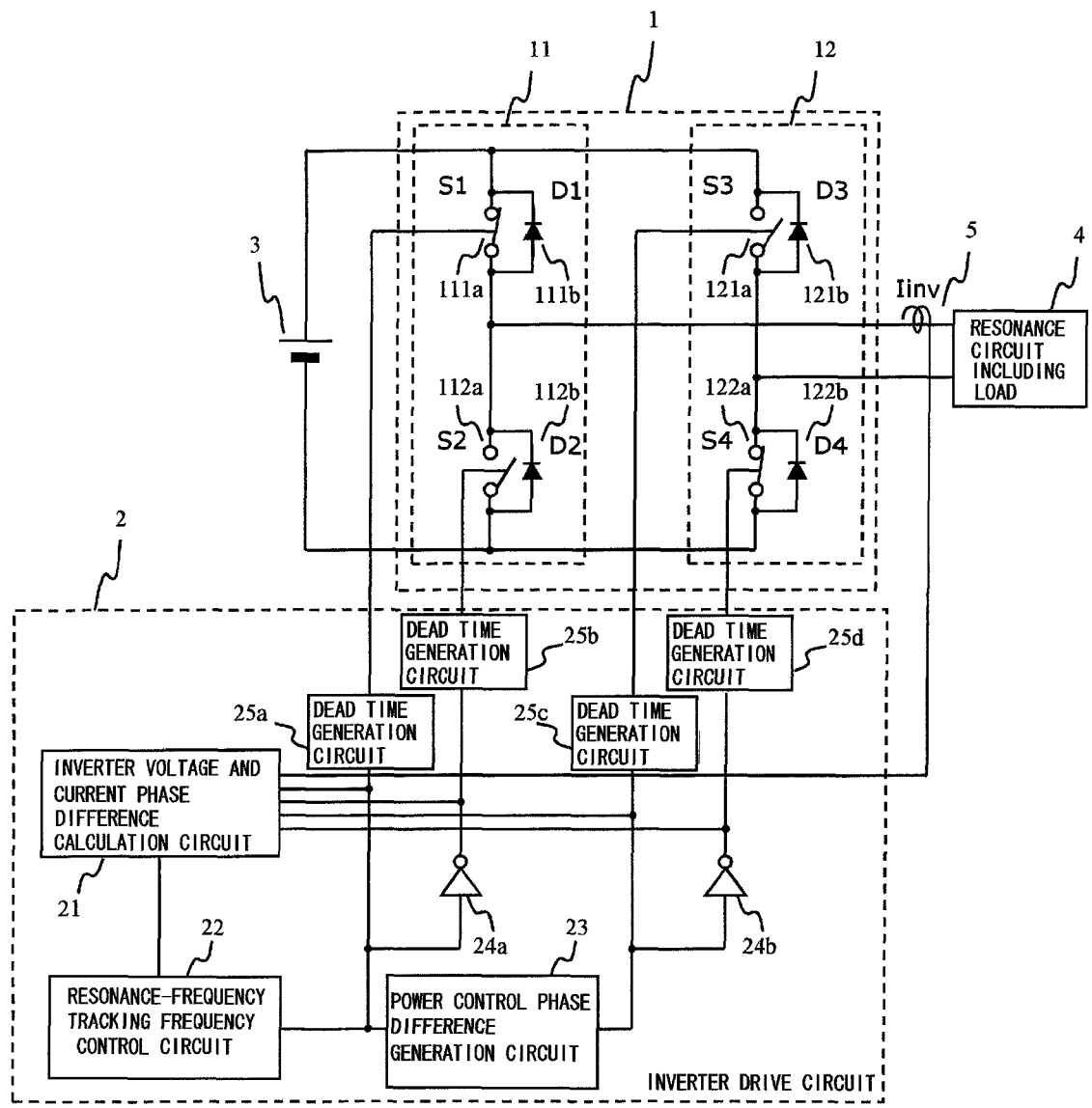
FIG. 11 is a block diagram showing a configuration of the phase shift inverter circuit according to the fourth embodiment.

As shown in FIG. 11, the inverter circuit according to the fourth embodiment controls the phase of the output current Iinv so that it is delayed with respect to the phase of the output voltage of the inverter circuit and achieves ZCS, similar to the second embodiment. However, the internal configuration of the inverter drive circuit unit 2 is different from that of the first and the second embodiments. In the first embodiment, inputs into the inverter voltage and current phase difference calculation circuit 21 are assumed as the inverter current detection signal, S1 and S3 driving signals, and the power control phase difference controlled variable. On the other hand, the fourth embodiment has a configuration, as shown in FIG. 11, that is, the inverter current detection signal, and driving signals of all of S1 to S4 are assumed as inputs, and the power control phase difference controlled variable is not inputted in the inverter voltage and current phase difference calculation circuit 21. Accordingly, the internal configurations of the inverter voltage and current phase difference calculation circuit 21 and the inverter-voltage fundamental wave signal A' generation circuit 218 are different from those of the first embodiment.

Figure 12:
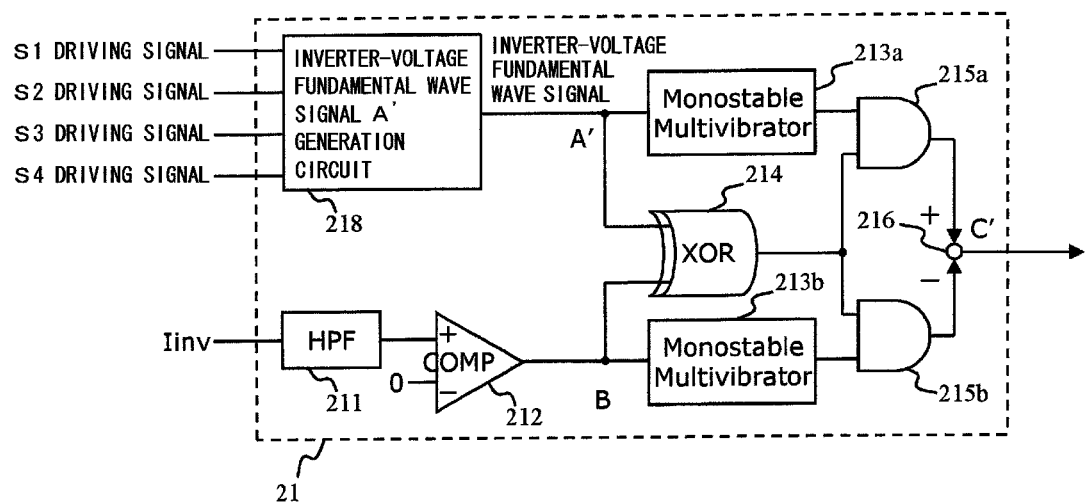
FIG. 12 is a block diagram showing a configuration of the inverter voltage and current phase difference calculation circuit 21 according to the fourth embodiment.
Figure 13:
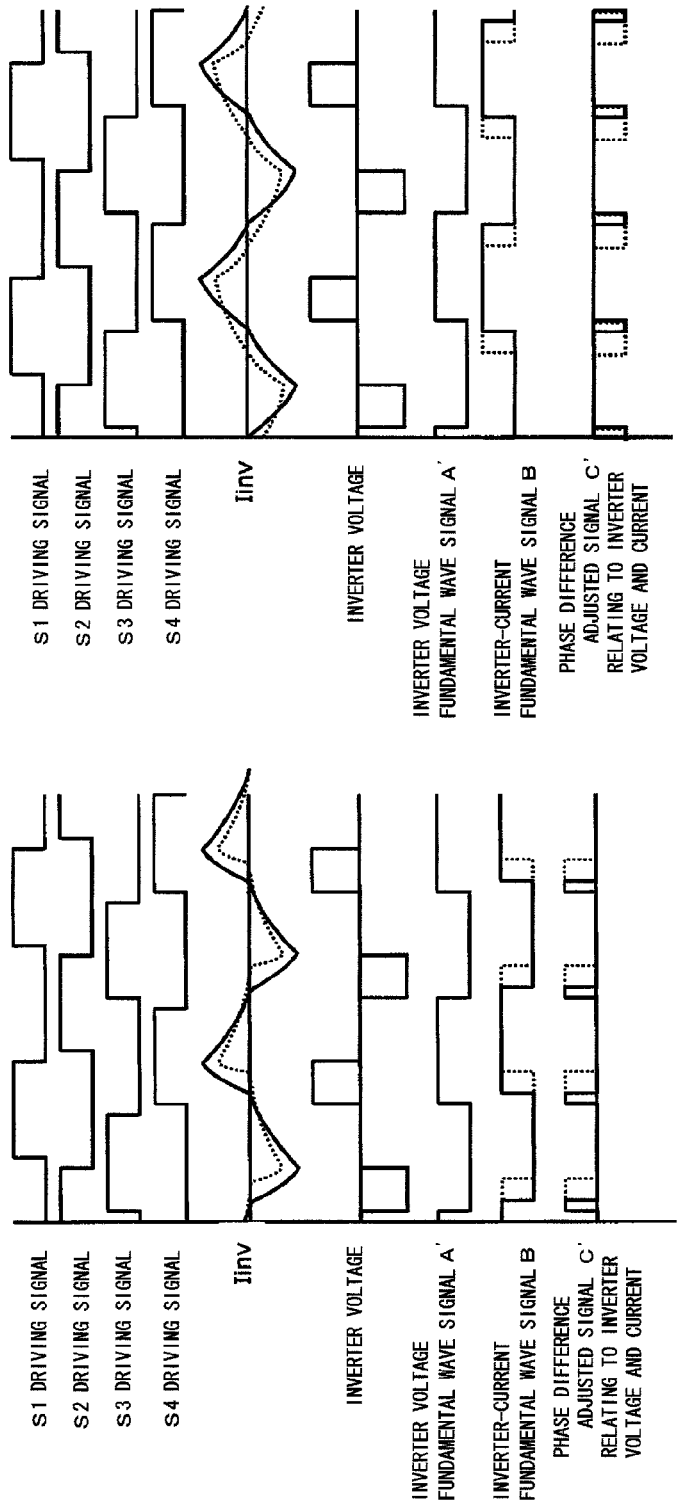
FIG. 13(*a*) illustrates operating waveforms of each part in the case where the inverter current is delayed from the inverter voltage (inverter operating frequency is higher than resonance frequency), and FIG. 13(*b*) illustrates operating waveforms of each part in the case where the inverter current leads the inverter voltage (inverter operating frequency is lower than resonance frequency), in the phase shift inverter circuit according to the fourth embodiment.
Figure 14:
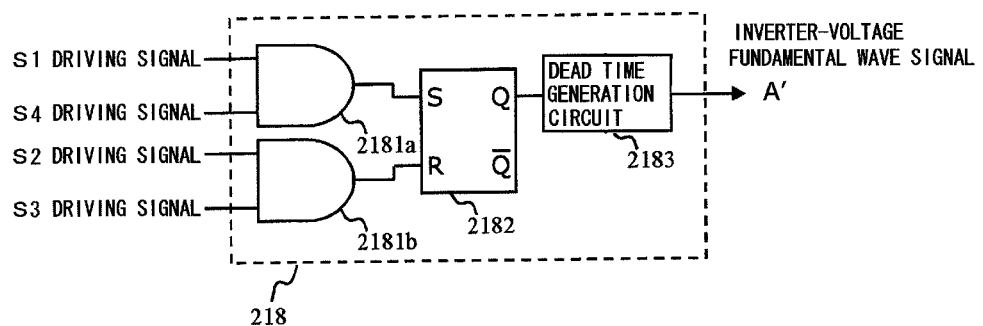
FIG. 14 is a block diagram showing a configuration of inverter-voltage fundamental wave signal A' generation circuit 218 according to the fourth embodiment.

FIG. 12 shows a configuration of the inverter voltage and current phase difference calculation circuit 21. FIG. 13(a) and FIG. 13(b) illustrate one example of waveforms respectively of the input signals as shown in FIG. 12, inverter voltage, and signals at A', B, and C' points. The dotted lines represent the case where the phase difference is further widened. FIG. 14 shows a configuration of the inverter-voltage fundamental wave signal A' generation circuit 218.

As shown in FIG. 12, driving signals of all the semiconductor switches (S1 to S4) are inputted into the inverter-voltage fundamental wave signal A' generation circuit 218, and a fundamental wave signal A' of the inverter voltage is generated.

As shown in FIG. 14, in the inverter-voltage fundamental wave signal A' generation circuit 218, an output signal from the AND operation 2181a relating to the S1 driving signal and the S4 driving signal, and an output signal from the AND operation 2181b relating to to the S2 driving signal and the S3 driving signal are obtained on the basis of the driving signals of the semiconductor switches (S1 to S4) 111a, 112a, 121a, and 122a. It is configured such that those output signals are inputted into the Set-Reset flip-flop circuit 2182, and the dead time generation circuit 2183 introduces a delay corresponding to a dead time, and the fundamental wave signal A' of the inverter voltage is obtained.

The inverter-voltage fundamental wave signal A' in the present embodiment is a signal with a duty cycle of 50%, which is inversed at the timing when the inverter voltage generates a positive polarity pulse or a negative polarity pulse from zero voltage. When a phase difference control is performed in the later stage based on the fundamental wave signal A' of this inverter voltage and the fundamental wave signal B of the inverter current, the inverter current can be constantly controlled to be in the phase being delayed with respect to the inverter voltage, thereby achieving ZCS. Simultaneously, the operating frequency of the inverter circuit is allowed to track the fluctuations of the resonance frequency in the resonance circuit including the load 4, at a frequency higher than the resonance frequency by a predetermined quantity.

With the configuration as thus described, the inverter-voltage fundamental wave signal A' generation circuit 218 according to the present embodiment is allowed to reduce the number of elements, compared to the inverter-voltage fundamental wave signal A generation circuit 21 according to the second and the third embodiments. Therefore, it is possible to achieve ZCS with the inverter circuit having less number of elements, and thus being simplified and downsized.

It is to be noted that according to the circuit configuration of the present embodiment, it is also possible to allow the current to lead the inverter-voltage fundamental wave A', as shown in FIG. 13(b).

<Fifth Embodiment>

Figure 15:
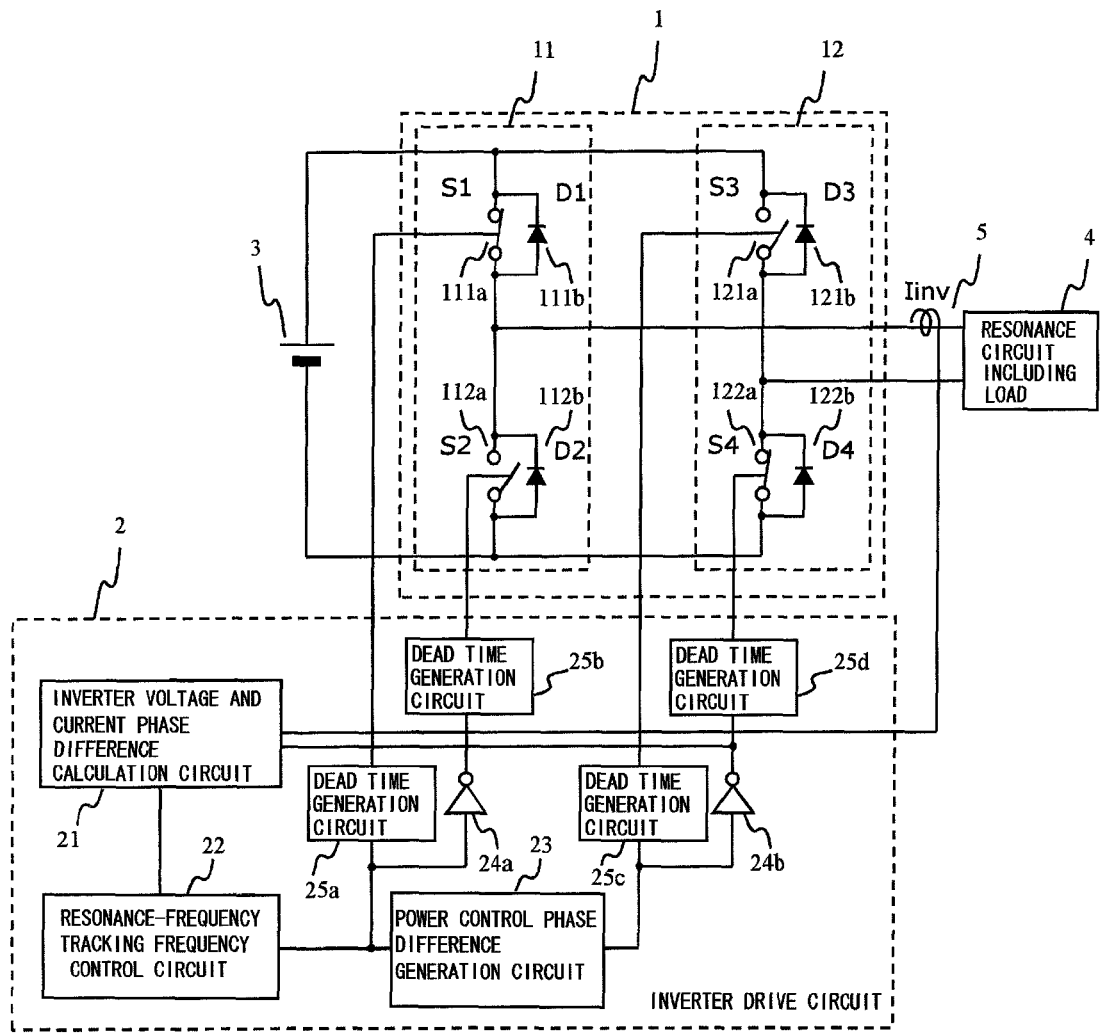
FIG. 15 is a block diagram showing a configuration of the phase shift inverter circuit according to the fifth embodiment.

FIG. 15 shows a block diagram of the inverter circuit according to the fifth embodiment. A basic structure of the fifth embodiment is the same as that of the fourth embodiment, but the internal configuration of the inverter drive circuit part 2 is different. In the fourth embodiment, the inverter voltage and current phase difference calculation circuit 21 inputs driving signals of all the switches (S1 to S4) 111*a*, 112*a*, 121*a*, and 122*a*. However, in the fifth embodiment, only the driving signal of the switch (S4) 122*a* is inputted in the inverter voltage and current phase difference calculation circuit 21. Accordingly, the internal configuration of the inverter voltage and current phase difference calculation circuit 21, that is, the inverter-voltage fundamental wave signal A' generation circuit 218 is different from that of the fourth embodiment.

Figure 16:
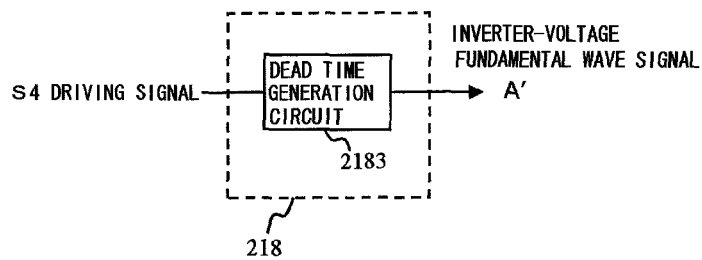
FIG. 16 is a block diagram showing a configuration of inverter-voltage fundamental wave signal A' generation circuit 218 according to the fifth embodiment.

FIG. 16 shows a configuration of the inverter-voltage fundamental wave signal A' generation circuit 218 according to the fifth embodiment. As shown in FIG. 16, the inverter-voltage fundamental wave signal A' generation circuit 218 incorporates only the dead time generation circuit 2183 which generates OFF time for a predetermined period of time, for the driving signal of the switch (S4) 122*a*. In other words, in the fifth embodiment, the inverter-voltage fundamental wave signal A' is not generated from the driving signals of all the switches of S1 to S4, but it is generated only on the basis of the driving signal of the switch S4. The present embodiment utilizes the fact that, assuming that there is no dead time, if Boolean algebra or a Karnaugh map is used to simplify a logical expression for generating the inverter-voltage fundamental wave signal A', the signal A' becomes equivalent to the driving signal of S4. In reality, there exists a dead time and it should be taken into account. Therefore, the dead time generation circuit 2183 delays rising of the driving signal of S4 for a predetermined time, and forms the dead time, thereby generating the fundamental wave signal A' of the inverter voltage.

As discussed above, in the fifth embodiment, it is possible to generate the inverter-voltage fundamental wave signal A' with a simple circuit configuration compared to the fourth embodiment. Therefore, compared to the inverter circuit according to the fourth embodiment, it is possible to achieve ZCS by the inverter circuit which has less number of elements, and thus being simplified and downsized. Simultaneously, the operating frequency of the inverter circuit is allowed to track fluctuations of the resonance frequency, at a frequency being higher by a predetermined amount, with respect to the resonance frequency of the resonance circuit including the load 4.

<Sixth Embodiment>

Figure 17:
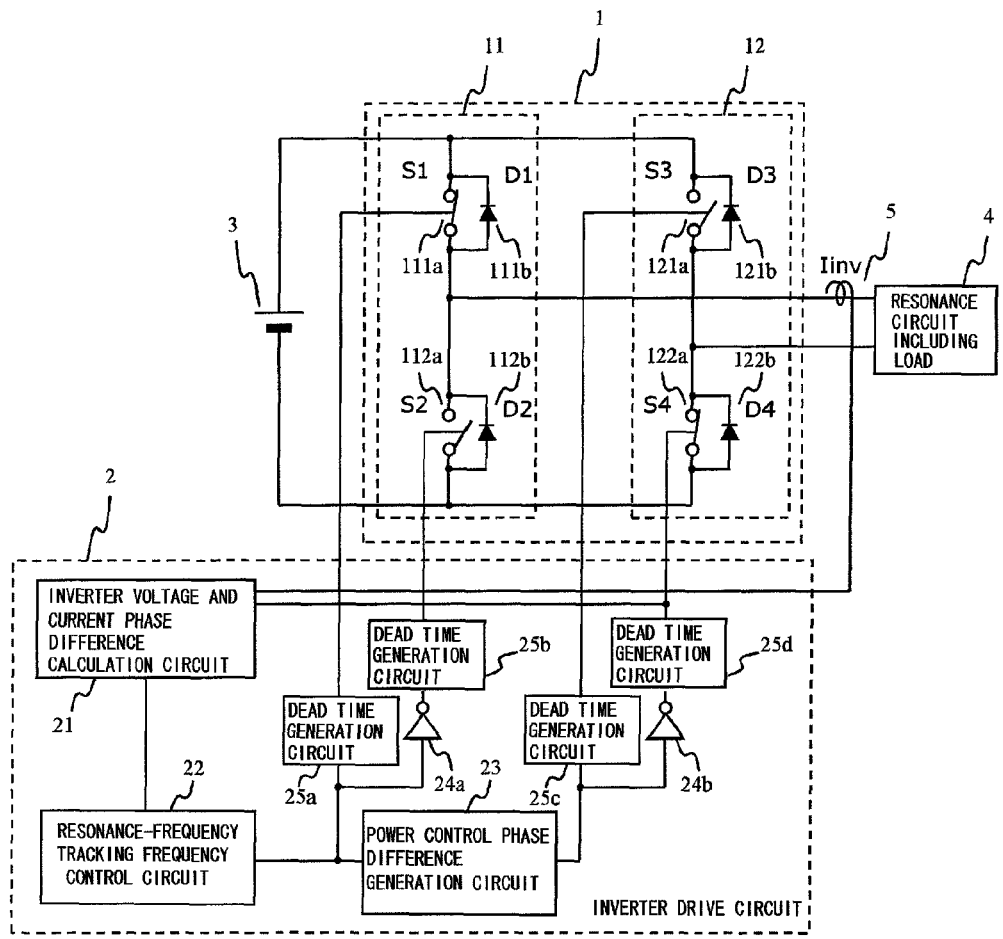
FIG. 17 is a block diagram showing a configuration of the phase shift inverter circuit according to the sixth embodiment.

FIG. 17 shows a block diagram of the inverter circuit according to the sixth embodiment. The inverter circuit according to the sixth embodiment operates basically in the same manner as the fifth embodiment, and the inverter-voltage fundamental wave signal A' is generated only based on the driving signal of the semiconductor switch (S4) 122*a*. In the fifth embodiment, the S4 driving signal is inputted into the inverter voltage and current phase difference calculation circuit 21, and the dead time generation circuit 2183 generates a dead time in the S4 driving signal, thereby forming the fundamental wave signal A'. In the sixth embodiment, however, the S4 driving signal after passing through the dead time generation circuit 25*d* is brought into the inverter voltage and current phase difference calculation circuit 21.

Figure 18:
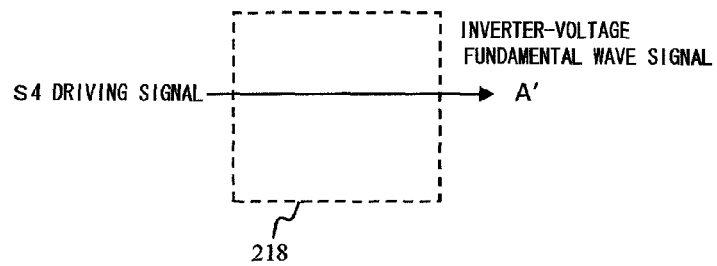
FIG. 18 is a block diagram showing a configuration of inverter-voltage fundamental wave signal A' generation circuit 218 according to the sixth embodiment.

Accordingly, the S4 driving signal to which the dead time has already been added can be brought into the inverter voltage and current phase difference calculation circuit 21. Therefore, as shown in FIG. 18, it is not necessary to place the dead time generation circuit in the inverter-voltage fundamental wave signal A' generation circuit 218.

With the configuration as described above, it is possible to provide an inverter circuit in which the number of elements is further reduced compared to the fifth embodiment. Therefore, ZCS can be achieved in the inverter circuit with further less number of elements, and thus being simplified and downsized, compared to the inverter circuit of the fifth embodiment. Simultaneously, the operating frequency of the inverter circuit tracks fluctuations of the resonance frequency at a frequency higher than the resonance frequency of the resonance circuit including the load 4, by a predetermined quantity.

It is to be noted that in the present embodiment, the output from the dead time generation circuit 25*d* is also inputted into the inverter voltage and current phase difference calculation circuit 21. Therefore, the impedance between the dead time generation circuit 25*d* and the semiconductor switch 122*a* becomes different from the impedance between the semiconductor switch (S1 to S3) 111*a*, 112*a*, and 121*a*, and the dead time generation circuits 25*a* to 25*c*, respectively. Therefore, it is desirable to take measures so that the impedances respectively between the dead time generation circuits 25*a*, 25*b*, 25*c*, and 25*d*, and the semiconductor switches 111*a*, 112*a*, 121*a*, and 122*a* become the same. By way of example, it is possible to use a method that the inverter voltage and current phase difference calculation circuit 21 employs a high-impedance input. Accordingly, it is possible to prevent occurrence of an erroneous operation due to the situation that the driving signals of the semiconductor switches in the inverter are unbalanced.

In the first embodiment to the sixth embodiment, the inverter-voltage fundamental wave signals A and A' are generated on the basis of the driving signals of the semiconductor switches (S1 to S4) and the power control phase difference controlled variable. However, there are various other methods for generating the inverter-voltage fundamental wave signals A and A'. The configurations described in the embodiments above are not limited examples. If a signal has a waveform with a duty cycle of 50% having a pulse width with a center equivalent to the center of the positive-polarity pulse width of the inverter output voltage, it is sufficient as the inverter-voltage fundamental wave signal A. If a signal has a duty cycle of 50% and it is inversed at the timing when the inverter voltage generates a positive polarity pulse or a negative polarity pulse from zero voltage, the signal is sufficient as the inverter-voltage fundamental wave signal A'.

In addition, the inverter-voltage fundamental wave signal A' described in the fifth and the sixth embodiments is assumed as a signal with a duty cycle of 50%, which is inversed at the timing when the inverter voltage generates a positive polarity pulse or a negative polarity pulse from zero voltage. However, considering a delay characteristic held by each of the surrounding circuit elements, inversing at a timing slightly delayed from the original operating waveform may allow a reliable operation in actual designing. Therefore, a delay circuit may be added in the last stage inside the inverter-voltage fundamental wave signal A' generation circuit, or immediately after the inverter-voltage fundamental wave signal A' generation circuit.

With the configurations as described in the second to the sixth embodiments, the inverter operation frequency is controlled so that it is held to be higher than the resonance frequency of the resonance circuit including the load 4, and while achieving ZCS, tracking the resonance frequency is implemented. If a lossless snubber capacitor is connected in parallel to the semiconductor switches, ZVS is also achieved, and switching loss can be drastically reduced, thereby providing a highly reliable inverter circuit.

<Seventh Embodiment>

As the seventh embodiment, an X-ray high voltage generator employing the first to the sixth embodiments described above will be explained with reference to FIG. 19.

Figure 19:
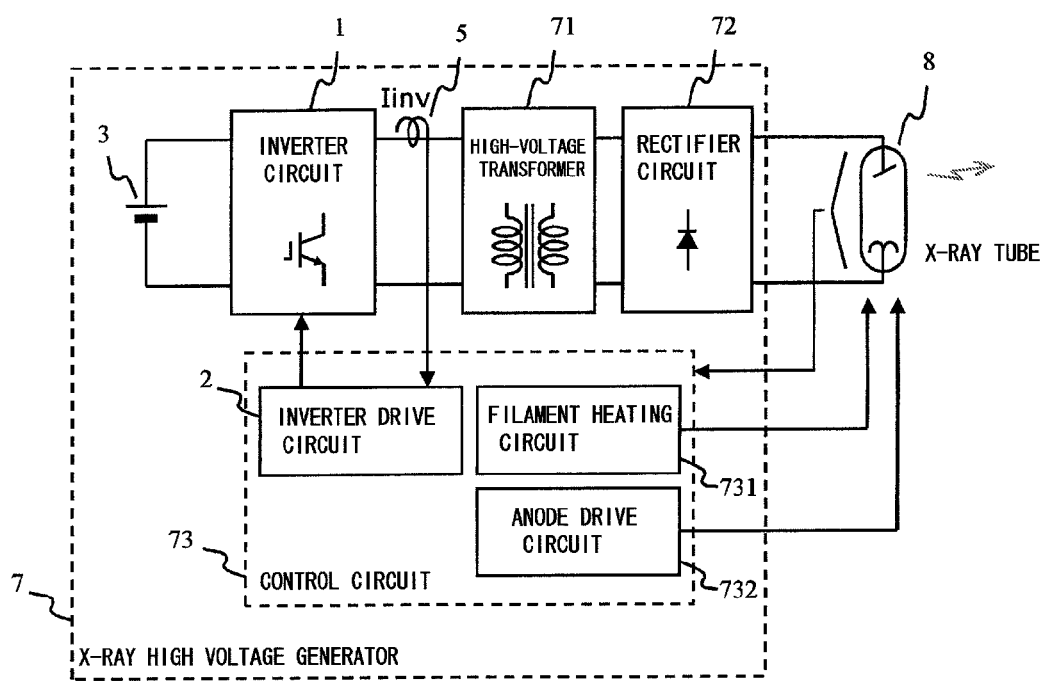
FIG. 19 is a block diagram showing a configuration of an X-ray high voltage generator according to the seventh embodiment.

As shown in FIG. 19, the X-ray high voltage generator 7 according to the present embodiment incorporates a phase shift inverter circuit part 1, a DC power supply 3, a control circuit 73, a current detector 5, a high voltage transformer 71, and a rectifier circuit 72. An X-ray tube 8 is connected to the rectifier circuit 72. The control circuit 73 is provided with an inverter drive circuit part 2, a filament heating circuit 731, and an anode drive circuit 732. Any one of the inverter circuits described in the first to the sixth embodiments may be employed as the inverter circuit part 1 and the inverter drive circuit part 2.

The DC power supply 3 is connected to the phase shift inverter circuit part 1, and high-frequency voltage being the output therefrom is insulated and converted into high voltage by the high-voltage transformer 71. Then, it is rectified by the rectifier circuit 72, thereby generating DC voltage. The DC high voltage outputted from the rectifier circuit 72 is applied to the X-ray tube 8, and a test subject is irradiated with X-rays from the X-ray tube. Each of the voltage and current applied to the X-ray tube 8 is assumed as a detecting value, and inputted in the control circuit 73 within the X-ray high voltage generator 7. The inverter drive circuit part 2 in the control circuit 73 is connected to the current sensor 5 for detecting output current from the phase shift inverter circuit part 1, and drives the semiconductor switches inside the phase shift inverter circuit. Operations and configurations of the phase shift inverter circuit part 1 and the inverter drive circuit part 2 are the same as those described in the first to the sixth embodiments.

The filament heating circuit 731 heats a filament of the X-ray tube 8. Accordingly, thermal electrons jump out of the filament being heated in the X-ray tube 8, collide with the anode, thereby generating heat and X-rays. The anode with which the thermal electrons collide may have a general structure that has a significantly large heat capacity and allows the anode itself to rotate and disperse energy to expand the heat capacity. The anode of the X-ray tube 8 is packaged in a vacuum chamber, and a rotating magnetic field is given from the outside of the vacuum chamber, thereby driving the isolated anode rotatably. The anode drive circuit 732 is a circuit for supplying electric power to generate the rotating magnetic field.

The X-ray high voltage generator 7 configured as described above accepts from an operator settings of tube voltage and tube current to be supplied to the X-ray tub 8, and controls the inverter circuit part 1 so that the control circuit 73 is given the set values. The set values of the tube voltage and the tube current may be 80 kV and 800 mA, 140 kV and 5 mA, or the like, covering a large extent from 100 kΩ to 28 MΩ, if simply replaced by equivalent resistance. The high-voltage transformer 71 has an inductance substance as a property of transformer. Furthermore, since the high-voltage transformer 71 is provided with a high insulation and a high turn ratio, it has a floating capacitance, i.e., a capacitance substance of winding, and therefore it holds a resonance point. As for the rectifier circuit 72, not only a full-wave rectifier made up of diodes only, but also a voltage doubler rectifier circuit or a full-wave multiple boosting circuit are put in practical use. In those circuit configurations, a capacitor is incorporated and thus the resonance circuit becomes further complicated.

A synthetic circuit of the high voltage transformer 71, the rectifier circuit 72, and the X-ray tube 8 serves as the load of the inverter circuit part 1, and its impedance has a wide range and the resonance frequency becomes different depending on the X-ray condition being set. As described in the first to the sixth embodiments, the inverter drive circuit part 2 generates the inverter-voltage and inverter-current fundamental wave signals, thereby allowing the inverter operating frequency to track the resonance frequency.

When the inverter drive circuit part 2 in any of the second to the sixth embodiments is employed, the inverter operating frequency is held and controlled to be a frequency higher than the resonance frequency, so that the inverter current has a phase being delayed relative to the inverter voltage, and therefore, ZCS is achieved in the inverter circuit part 1. If the lossless snubber capacitor is connected to the semiconductor switches, ZVS is also achieved, and switching loss can be largely reduced, thereby enabling the X-ray high voltage generator with a high reliability to be provided.

In addition, by using the X-ray high voltage generator according to the present embodiment, an X-ray CT apparatus, or an X-ray imaging apparatus may be configured. Accordingly, there is less switching loss in the X-ray high voltage generator, also allowing a tracking of load fluctuation, and therefore, it is possible provide an X-ray CT apparatus or an X-ray imaging apparatus, being energy efficient with stable operation.

<Eighth Embodiment>

As the eighth embodiment, an X-ray CT (Computer Tomography) apparatus using the X-ray high voltage generator according to the aforementioned seventh embodiment will be explained with reference to FIG. 20.

Figure 20:
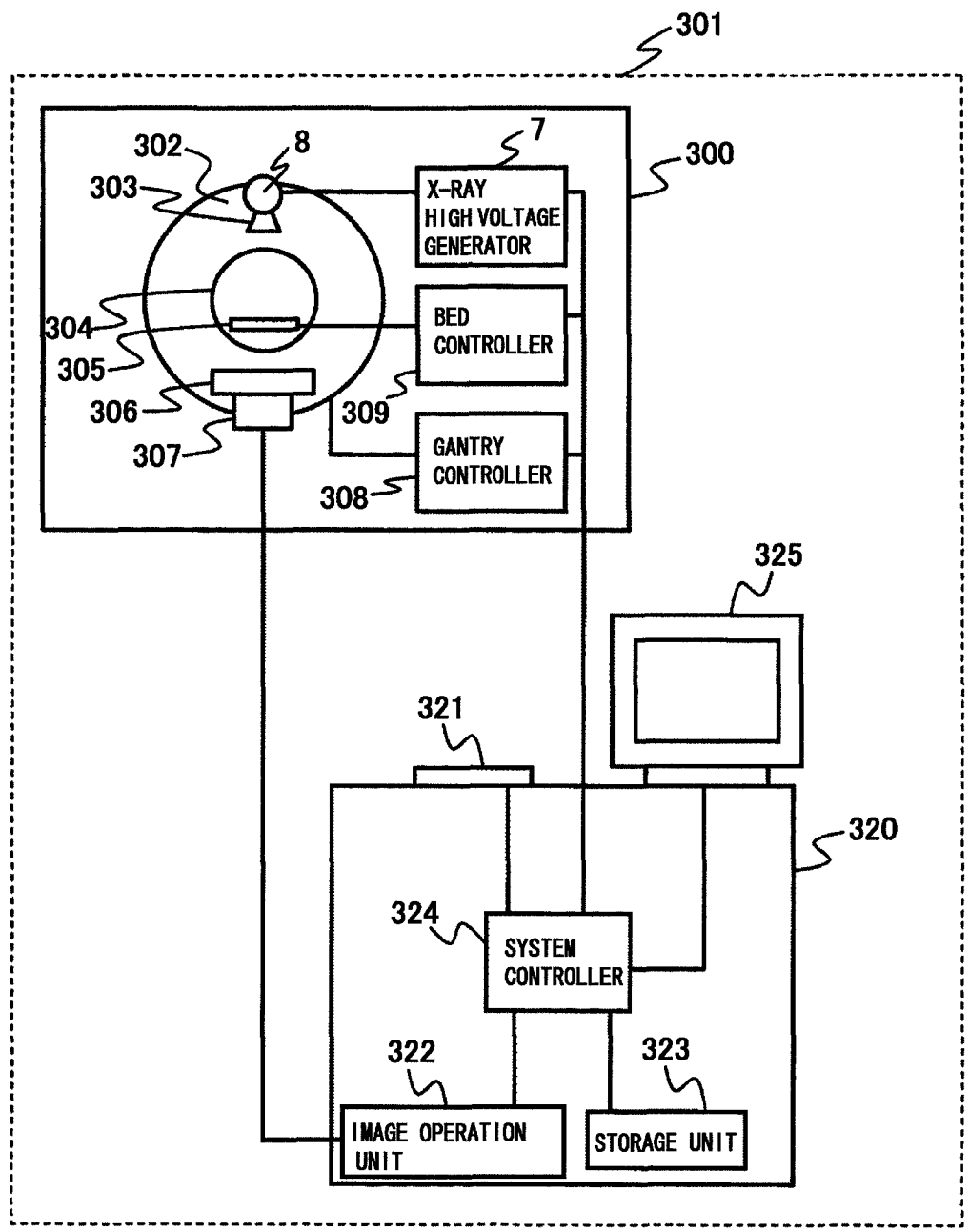
FIG. 20 is a block diagram showing a configuration of an X-ray CT apparatus according to the eighth embodiment.

FIG. 20 is an overall block diagram of the X-ray CT apparatus 301 to which the present invention is applied. This apparatus is provided with a scan gantry 300 and a console 320.

The scan gantry part 300 incorporates the X-ray tube 8, a rotating disk 302, a collimator 303, an X-ray detector 306, a data collector 307, a bed 305, a gantry controller 308, a bed controller 309, and the X-ray high-voltage generator 7. The X-ray tube 8 is a system for irradiating a test subject placed on the bed 305 with X-rays. The collimator 303 is a system for controlling the range of the X-ray irradiation from the X-ray tube 8. The X-ray detector 306 is a system placed being opposed to the X-ray tube 8, for detecting X-rays transmitted through the test subject. The rotating disk 302 is provided with an aperture 304 which the test subject placed on the bed 305 enters, and it is equipped with the X-ray tube 8 and the X-ray detector 306, further provided with a drive unit which rotates around the test subject. The X-ray detector 306 has a configuration on which multiple (e.g., 1000 units of) detection elements are arranged in the rotating direction (channel direction) of the rotating disk 302. Multiple detection elements may be arranged in multiple lines (e.g., 64 lines) in the rotating axis direction (slice direction) of the rotating disk 302, when one line is assumed as being along the rotating direction.

The X-ray high voltage generator 7 is a system for supplying tube voltage and tube current to be provided to the X-ray tube 8, and this system uses the X-ray high voltage generator 7 according to the seventh embodiment. The data collector 307 is a system for converting X-rays detected by the X-ray detector 306 into predetermined electrical signals. The gantry controller 308 is a system for controlling the rotation of the rotating disk 302. The bed controller 309 is a system for controlling vertical movement and horizontal movement (movement in the rotating axis direction of the rotating disk 302) of the bed 305.

The console 320 is provided with an input unit 321, an image operation unit 322, a display unit 325, a storage unit 323, and a system control unit 324. The input unit 321 is a system for inputting a name of the test subject, date and time of the test, an imaging condition, and the like, and specifically, it may be a keyboard, a pointing device, or the like. The image operation unit 322 is a system for carrying out arithmetic processing on measured data sent from the data collector 307, thereby reconstructing a CT image, and specifically it is a CPU (Central Processing Unit) for executing arithmetic processing, or a dedicated arithmetic circuit. The display unit 325 is a system for displaying the CT image that is generated by the image operation unit 322, and specifically, it is a CRT (Cathode Ray Tube) or a liquid crystal display, or the like. The storage unit 323 is a system for storing data collected by the data collector 307 and image data of the CT image generated by the image operation unit 322, and specifically, it is an HD (Hard Disk) or the like. The system controller 324 is a system for controlling those units described above together with the gantry controller 308, the bed controller 309, and the X-ray high voltage generator 7.

The X-ray tube 8 is supplied with the tube current and the tube voltage which are controlled by the X-ray high voltage generator 7, in such a manner that the tube current and the tube voltage satisfy the imaging conditions (tube voltage, tube current, and the like) inputted from the input unit 321, and irradiates X-rays. The configuration of the X-ray high voltage generator 7 has been explained in the seventh embodiment, and the explanation thereof will not be given here.

The X-rays irradiated from the X-ray tube 8 and passed through the test subject are detected by the X-ray detection elements provided in the X-ray detector 306. During this time, the rotating disk 302 allows the X-ray tube 8 and the X-ray detector 306 to rotate, thereby irradiating the test subject with X-rays and detecting X-rays in various directions. Rotation speed of the rotating disk 302 is controlled by the gantry controller 308 so that the speed satisfies the imaging conditions (e.g., scan speed) which are inputted from input unit 321. While the X-rays are irradiated and detected, the bed controller 309 controls the bed 305 to move the test subject in the body axis direction, and operates so as to satisfy the imaging conditions (helical pitch, and the like) inputted from the input unit 321.

The data collector 307 collects output signals from the X-ray detector 306. Projection data collected by the data collector 307 is issued to the image operation unit 322. The image operation unit 322 performs operation for reconstructing the projection data to form a CT image. The CT image being reconstructed is displayed on the display unit 325, and stored in the storage unit 323 as image data together with the imaging conditions.

The X-ray high voltage generator 7 of the present invention is employed in the X-ray CT apparatus of the present embodiment, achieving less switching loss in the X-ray high voltage generator and allowing tracking of the load fluctuation, thereby providing the X-ray CT apparatus being energy efficient and enabling stable operations.

<Ninth Embodiment>

As the ninth embodiment, an X-ray imaging apparatus using the X-ray high voltage generator according to the seventh embodiment will be explained with reference to FIG. 21.

Figure 21:
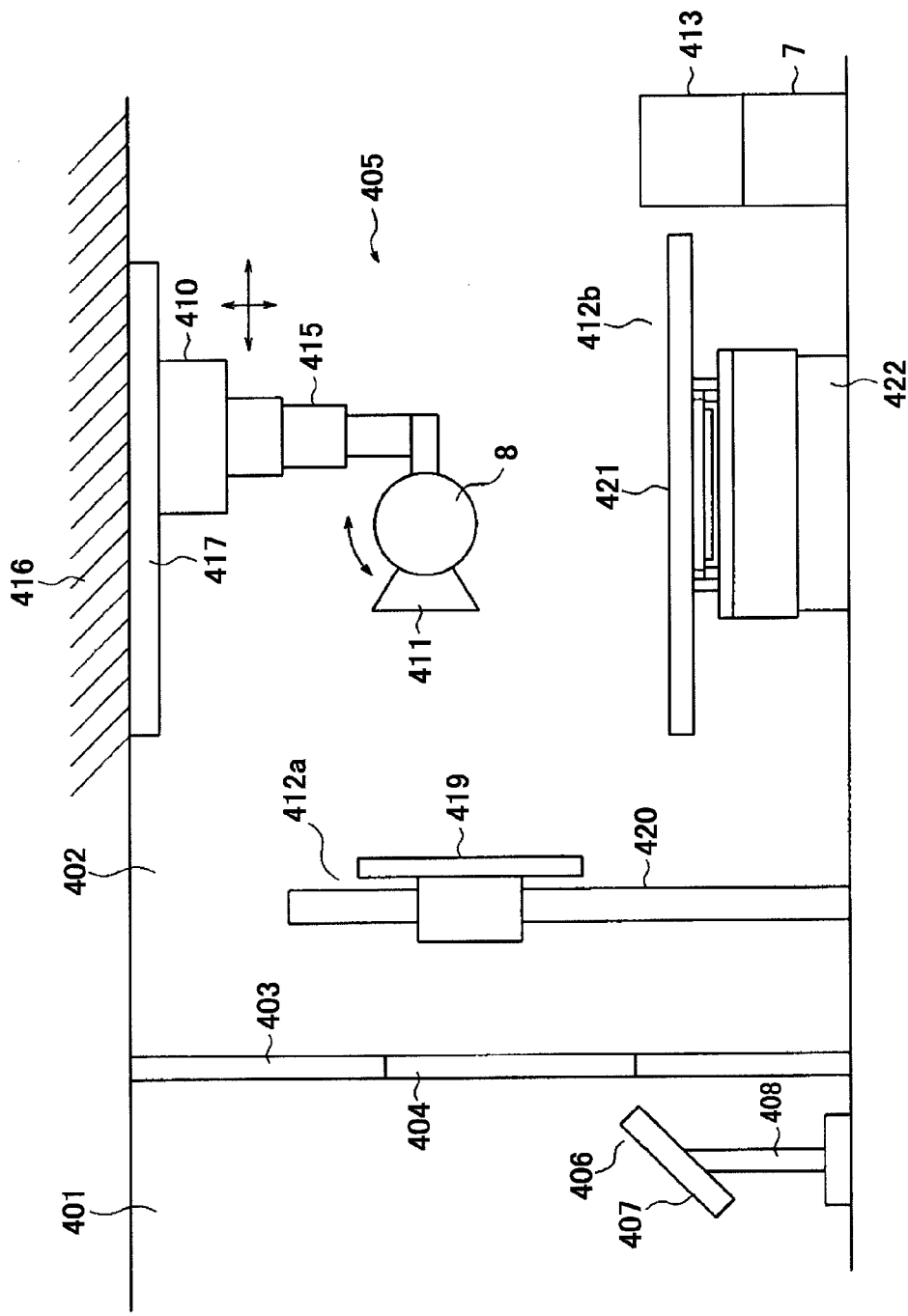
FIG. 21 is a block diagram showing a configuration of an X-ray imaging apparatus according to the ninth embodiment.

As shown in FIG. 21, the X-ray imaging apparatus 405 according to the present embodiment is installed in such a manner as extending over an operators room 401 and an imaging room 402. The operators room 401 and the imaging room 402 of the X-ray examination room in a hospital are isolated from each other by a protection shield 403 against X-rays. The protection shield 403 is provided with a window 404 made of lead glass.

A major configuration of the X-ray imaging apparatus 405 is installed in the imaging room 402. Specifically, the X-ray tube 8, an X-ray tube supporter 410, the collimator 411, X-ray image receivers 412a and 412b, the X-ray high voltage generator 7, and a controller 413 are installed on predetermined positions, respectively. The X-ray tube 8 is a system for generating X-rays with which a test subject is irradiated. The X-ray high voltage generator 7 supplies the tube voltage and the tube current being set, to the X-ray tube 8. Since the X-ray high voltage generator 7 is the system according to the seventh embodiment, detailed structure thereof will not be explained here.

The X-ray tube supporter 410 has an L-shaped telescopic unit 415 with a structure which telescopically moves in the vertical direction as shown in the page of FIG. 21. The X-ray tube 8 is held at the end of the L-shape of the telescopic unit 415. The X-ray tube supporter 410 is installed on a rail 417 disposed at a ceiling 416. The X-ray tube supporter 410 has a structure movable along the rail 417 in the horizontal direction as shown in the page of FIG. 21. The collimator 411 determines a radiation field of X-rays.

The X-ray image receivers 412a and 412b are systems for receiving X-rays passed through the test subject, and according to the present embodiment, there are two units being provided. One X-ray image receiver 412a is for imaging the test subject in standing position, and the other X-ray image receiver 412b is for imaging the test subject lying down. The X-ray image receiver 412a for standing position has a configuration including a cassette for imaging, which contains a film and an imaging plate, and a support 420 for supporting the cassette for imaging. The X-ray image receiver 412b for lie position includes an imaging platform 422, and a cassette for imaging 421 which contains the film and the imaging plate being incorporated in the imaging platform. When the X-ray image receiver 412a for standing position is used, as shown in FIG. 21, the X-ray tube 8 and the collimator 411 are placed laterally facing to the X-ray image receiver 412a for standing position. On the other hand, when the X-ray image receiver 412b for lie position is used, the X-ray tube 8 and the collimator 411 are made to face downwardly, so that X-rays are irradiated toward the X-ray image receiver 412b.

It is further possible to configure such that an X-ray image is outputted in a form of moving picture, combining an image intensifier and a TV camera, instead of the cassettes for imaging 419 and 421, or another configuration may be possible such as installing a flat panel detector (FPD) to output an X-ray image.

A manipulator 406 is installed in the operators room 401. This manipulator 406 is made up of the console 407 and a supporter 408 for supporting the console 407. The console 407 is provided with an operation part for accepting an operator's settings of imaging conditions such as tube voltage, tube current, and imaging time of the X-ray tube 8, and a display part. The display part displays setting conditions being accepted, and an image received by the X-ray image receivers 412a and 412b. The console 407 is further provided with a switch for actuating the X-ray high voltage generator 7 and an operation button for adjusting opening and closing amount of the collimator 411.

The controller 413 controls each of the units described above, and controls displaying images received by the X-ray image receivers 412a and 412b. The controller 413 incorporates a storage unit, and stores the imaging conditions and taken images.

Furthermore, the X-ray high voltage generator according to the present invention is employed in the X-ray imaging apparatus of the present embodiment, thereby allowing less switching loss in the X-ray high voltage generator, and tracking the load fluctuation. Therefore, it is possible to provide the X-ray imaging apparatus being energy efficient and enabling stable operation.

DENOTATION OF REFERENCE NUMERALS

1 . . . INVERTER CIRCUIT PART 2 . . . INVERTER DRIVER CIRCUIT PART, 3 . . . DC POWER SOURCE, 4 . . . RESONANCE CIRCUIT INCLUDING LOAD, 5 . . . CURRENT SENSOR, 7 . . . X-RAY HIGH VOLTAGE GENERATOR, 8 . . . X-RAY TUBE, 11, 12 . . . ARM CIRCUIT, 21 . . . INVERTER VOLTAGE AND CURRENT PHASE DIFFERENCE CALCULATION CIRCUIT, 22 . . . RESONANCE-FREQUENCY TRACKING FREQUENCY CONTROL CIRCUIT, 23 . . . POWER CONTROL PHASE DIFFERENCE GENERATION CIRCUIT, 24a, 25b . . . INVERSION LOGIC CIRCUIT, 25a, 25b, 25c, 25d, 2183 . . . DEAD TIME GENERATION CIRCUIT, 71 . . . HIGH-VOLTAGE TRANSFORMER, 72 . . . RECTIFIER, 73 . . . CONTROL CIRCUIT, 111a, 112a, 121a, 122a . . . SEMICONDUCTOR SWITCH, 111b, 112b, 121b, 122b . . . DIODE, 210 . . . INVERTER-VOLTAGE FUNDAMENTAL WAVE SIGNAL A GENERATION CIRCUIT, 211 . . . HIGH PASS FILTER, 212, 2106 . . . COMPARATOR, 213a, 213b, 2102 . . . MONOSTABLE MULTIVIBRATOR, 214 . . . EXCLUSIVE OR OPERATION UNIT, 215a, 215b, 2181a, 2181b . . . AND OPERATION UNIT, 216, 224, 2104a, 2104b . . . ADDER, 217 . . . DELAY ADDITION CIRCUIT, 218 . . . INVERTER-VOLTAGE FUNDAMENTAL WAVE SIGNAL A' GENERATION CIRCUIT, 221, 2105 . . . AMPLIFIER, 222 . . . PI COMPENSATOR, 223 . . . VCO (Voltage Controlled Oscillator), 300 . . . SCAN GANTRY, 302 . . . ROTATING DISK, 303 . . . COLLIMATOR, 305 . . . BED, 306 . . . X-RAY DETECTOR, 307 . . . DATA COLLECTOR, 308 . . . GANTRY CONTROLLER, 309 . . . BED CONTROLLER, 320 . . . CONSOLE, 321 . . . INPUT UNIT, 322 . . . IMAGE OPERATION UNIT, 323 . . . STORAGE UNIT, 324 . . . SYSTEM CONTROLLER, 325 . . . DISPLAY UNIT, 401 . . . OPERATORS ROOM, 402 . . . IMAGING ROOM, 403 . . . PROTECTION SHIELD, 404 . . . WINDOW, 405 . . . X-RAY IMAGING APPARATUS, 406 . . . MANIPULATOR, 407 . . . CONSOLE, 408 . . . SUPPORTER, 410 . . . X-RAY TUBE SUPPORTER, 411 . . . COLLIMATOR, 412a, 412b . . . X-RAY IMAGE RECEIVER, 413 . . . CONTROLLER, 415 . . . TELESCOPIC UNIT, 416 . . . CEILING, 417 . . . RAIL, 410 CASSETTE FOR IMAGING, 420 . . . SUPPORTER, 421 . . . CASSETTE FOR IMAGING, 422 . . . IMAGING PLATFORM, 731 . . . FILAMENT HEATING CIRCUIT, 732 . . . ANODE DRIVE CIRCUIT, 2101 . . . SAWTOOTH WAVE GENERATION CIRCUIT, 2103 . . . SAMPLE HOLD CIRCUIT, 2107 . . . D FLIP-FLOP CIRCUIT, 2182 . . . Set-Reset FLIP FLOP CIRCUIT

What is claimed is:

1. A phase shift inverter circuit comprising:
an inverter circuit part where two arm circuits are connected in parallel, each arm circuit having two semiconductor switches being serially connected, the switches respectively connected inversely in parallel with diodes; and
an inverter drive circuit part for providing a driving signal to each of the semiconductor switches of the inverter circuit,
wherein the inverter drive circuit part obtains a phase difference between output current and output voltage directed to a load circuit which is connected to a midpoint of the two arm circuits, and controls a phase of the driving signal directed to each of the semiconductor switches in such a manner that the phase difference between the output current and the output voltage becomes zero or a predetermined value, thereby allowing an operating frequency of the inverter circuit part to track a resonance frequency of the load circuit,
wherein the inverter drive circuit part controls the phase of the driving signal of each of the semiconductor switches, in such a manner that the output current has a phase delayed from the output voltage by a predetermined value.

2. The phase shift inverter circuit according to claim 1, wherein the inverter drive circuit part adjusts a phase difference of the driving signals directed to the semiconductor switches which are determined in advanced to be used in a pair, among four semiconductor switches in the inverter circuit part, thereby enabling a control of an output power of the inverter circuit part.

3. The phase shift inverter circuit according to claim 1, wherein the inverter drive circuit part comprises a circuit for generating a fundamental wave signal with a certain duty cycle having a pulse width with a center equivalent to the center of a positive-polarity pulse width of the output voltage, and the driving signal is allowed to be generated by use of the fundamental wave signal.

4. The phase shift inverter circuit according to claim 1, wherein the inverter drive circuit part comprises a circuit for generating a fundamental wave signal with a certain duty cycle, the signal being inversed at a timing when the output voltage is changed from zero voltage to a positive polarity pulse or a negative polarity pulse, and the driving signal is allowed to be generated by use of the fundamental wave signal.

5. The phase shift inverter circuit according to claim 1, wherein the inverter drive circuit part obtains the phase difference between the output current and the output voltage, by using a phase of the current detected between the midpoint of the two arm circuits and the load circuit as the output current, and by using the phase of the driving signal as the phase of the output voltage.

6. An X-ray high voltage generator comprising:
a phase shift inverter circuit for converting a DC power source output into a high-frequency AC output;
a high voltage transformer for converting the high-frequency AC output of the inverter circuit into a high voltage output;
a rectifier circuit for rectifying the output of the high voltage transformer and supplying DC power to an X-ray tube; and
a control circuit,
wherein the control circuit comprises a filament heating circuit for heating a filament of the X-ray tube, and an anode rotary drive circuit for performing rotary drive of an anode of the X-ray tube, and
wherein the inverter circuit corresponds to the phase shift inverter circuit according to claim 1.

7. An X-ray CT apparatus comprising:
a disc provided with an aperture for inserting a test subject;
an X-ray tube and an X-ray detector respectively mounted on positions opposed to each other placing the aperture of the disc therebetween;
an X-ray high voltage generator for supplying DC power to the X-ray tube;
a bed for placing the test subject thereon to be inserted into the aperture of the disc; and
a rotary drive part for rotating the disk, wherein the X-ray high voltage generator corresponds to the X-ray high voltage generator according to claim 6.

8. An X-ray imaging apparatus comprising:
an X-ray tube;
an X-ray image receiver for detecting X-rays transmitted through a test subject; and
an X-ray high voltage generator for supplying DC power to the X-ray tube,
wherein the X-ray high voltage generator corresponds to the X-ray high voltage generator according to claim 6.

9. A phase shift inverter circuit comprising:
an inverter circuit part where two arm circuits are connected in parallel, each arm circuit having two semiconductor switches being serially connected, the switches respectively connected inversely in parallel with diodes; and
an inverter drive circuit part for providing a driving signal to each of the semiconductor switches of the inverter circuit,
wherein the inverter drive circuit part obtains an operating frequency of output power directed to a load circuit which is connected to a midpoint of the two arm circuits, and controls a phase of the driving signal directed to each of the semiconductor switches in such a manner that the operating frequency becomes higher than a resonance frequency of the load circuit, by a predetermined value,
wherein the inverter drive circuit part comprises a circuit for generating a fundamental wave signal with a certain duty cycle having a pulse width with a center equivalent to the center of positive-polarity pulse width of an output voltage, and the driving signal is allowed to be generated by use of the fundamental wave signal.

10. The phase shift inverter circuit according to claim 9, wherein the inverter drive circuit part adjusts a phase difference of the driving signals directed to the semiconductor switches which are determined in advance to be used in a pair, among four semiconductor switches in the inverter circuit part, thereby enabling a control of the output power of the inverter circuit part.

11. An X-ray high voltage generator comprising:
a phase shift inverter circuit for converting a DC power source output into a high-frequency AC output;
a high voltage transformer for converting the high-frequency AC output of the inverter circuit into a high voltage output;
a rectifier circuit for rectifying the output of the high voltage transformer and supplying DC power to an X-ray tube; and
a control circuit,
wherein the control circuit comprises a filament heating circuit for heating a filament of the X-ray tube, and an anode rotary drive circuit for performing rotary drive of an anode of the X-ray tube, and
wherein the inverter circuit corresponds to the phase shift inverter circuit according to claim 9.

12. An X-ray CT apparatus comprising:
a disc provided with an aperture for inserting a test subject;
an X-ray tube and an X-ray detector respectively mounted on positions opposed to each other placing the aperture of the disc therebetween;
an X-ray high voltage generator for supplying DC power to the X-ray tube;
a bed for placing the test subject thereon to be inserted into the aperture of the disc; and
a rotary drive part for rotating the disc, wherein the X-ray high voltage generator corresponds to the X-ray high voltage generator according to claim 11.

13. An X-ray imaging apparatus comprising:
an X-ray tube;
an X-ray image receiver for detecting X-rays transmitted through a test subject; and
an X-ray high voltage generator for supplying DC power to the X-ray tube,
wherein the X-ray high voltage generator corresponds to the X-ray high voltage generator according to claim 11.

14. A phase shift inverter circuit comprising:
an inverter circuit part where two arm circuits are connected in parallel, each arm circuit having two semiconductor switches being serially connected, the switches respectively connected inversely in parallel with diodes; and
an inverter drive circuit part for providing signal to each of the semiconductor switches of the inverter circuit,
wherein the inverter drive circuit part obtains an operating frequency of output power directed to a load circuit which is connected to a midpoint of the two arm circuits, and controls a phase of the driving signal directed to each of the semiconductor switches in such a manner that the operating frequency becomes higher than a resonance frequency of the load circuit, by a predetermined value, and
wherein the inverter drive circuit part comprises a circuit for generating a fundamental wave signal with a certain duty cycle, the signal being inversed at a timing when an output voltage is changed from zero voltage to a positive polarity pulse or a negative polarity pulse, and the driving signal is allowed to be generated by use of the fundamental wave signal.

15. The phase shift inverter circuit according to claim 14, wherein the inverter drive circuit part adjusts a phase difference of the driving signals directed to the semiconductor switches which are determined in advance to be used in a pair, among four semiconductor switches in the inverter circuit part, thereby enabling a control of the output power of the inverter circuit part.

16. An X-ray high voltage generator comprising:
a phase shift inverter circuit for converting a DC power source output into a high-frequency AC output;
a high voltage transformer for converting the high-frequency AC output of the inverter circuit into a high voltage output;
a rectifier circuit for rectifying the output of the high voltage transformer and supplying DC power to an X-ray tube; and
a control circuit,
wherein the control circuit comprises a filament heating circuit for heating a filament of the X-ray tube, and an anode rotary drive circuit for performing rotary drive of an anode of the X-ray tube,
wherein the inverter circuit corresponds to the phase shift inverter circuit according to claim 14.

17. An X-ray CT apparatus comprising:
a disc provided with an aperture for inserting a test subject;
an X-ray tube and an X-ray detector respectively mounted on positions opposed to each other placing the aperture of the disc therebetween;
an X-ray high voltage generator for supplying DC power to the X-ray tube;
a bed for placing the test subject thereon to be inserted into the aperture of the disc; and a rotary drive part for rotating the disc, wherein the X-ray high voltage generator corresponds to the X-ray high voltage generator according to claim 16.

18. An X-ray imaging apparatus comprising:

an X-ray tube;

an X-ray image receiver for detecting X-rays transmitted through a test subject; and an X-ray high voltage generator for supplying DC power to the X-ray tube, wherein the X-ray high voltage generator corresponds to the X-ray high voltage generator according to claim 16.

* * * * *